United States Patent
Maeda et al.

(10) Patent No.: US 6,777,078 B2
(45) Date of Patent: Aug. 17, 2004

(54) MAGNETIC RECORDING MEDIUM WITH L10 CRYSTAL GRAINS INCLUDING THREE OR MORE ELEMENTS

(75) Inventors: Tomoyuki Maeda, Yokohama (JP);
Akira Kikitsu, Yokohama (JP);
Toshihiko Nagase, Kawasaki (JP);
Junichi Akiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 10/050,118

(22) Filed: Jan. 18, 2002

(65) Prior Publication Data

US 2002/0098383 A1 Jul. 25, 2002

(30) Foreign Application Priority Data

Jan. 19, 2001 (JP) .................................... 2001-012119

(51) Int. Cl.$^7$ ................................................. G11B 5/65
(52) U.S. Cl. .................................. 428/336; 428/694 T
(58) Field of Search .............................. 428/336, 694 T

(56) References Cited

U.S. PATENT DOCUMENTS

| | | | | |
|---|---|---|---|---|
| 5,989,728 A | * | 11/1999 | Coffey et al. ............... | 428/611 |
| 5,993,956 A | * | 11/1999 | Lambeth et al. ............ | 428/332 |
| 6,086,974 A | * | 7/2000 | Thiele et al. ............... | 428/65.3 |
| 2003/0108721 A1 | * | 6/2003 | Fullerton et al. .......... | 428/195 |

FOREIGN PATENT DOCUMENTS

JP 9-320847 12/1997

OTHER PUBLICATIONS

O. Kitakami, et al. "Low–Temperature Ordering of $L1_o$–CoPt Thin Films Promoted by Sn, Pb, Sb, and Bi Additives", Applied Physics Letters, vol. 78, No. 8, Feb. 19, 2001, pp. 1104–1106.

* cited by examiner

Primary Examiner—Ramsey Zacharia
Assistant Examiner—Kevin M. Bernatz
(74) Attorney, Agent, or Firm—Oblon, Spivak, McClelland, Maier & Neustadt, P.C.

(57) ABSTRACT

A magnetic recording medium has a substrate, an underlayer formed on the substrate, a magnetic layer formed on the underlayer and including crystal grains having an $L1_0$ structure mainly including Fe and Pt, mainly including Fe and Pd, or mainly including Co and Pt, and the crystal grains further including 0.1 to 50 atomic percent of at least one additive element dissolved therein.

17 Claims, 16 Drawing Sheets

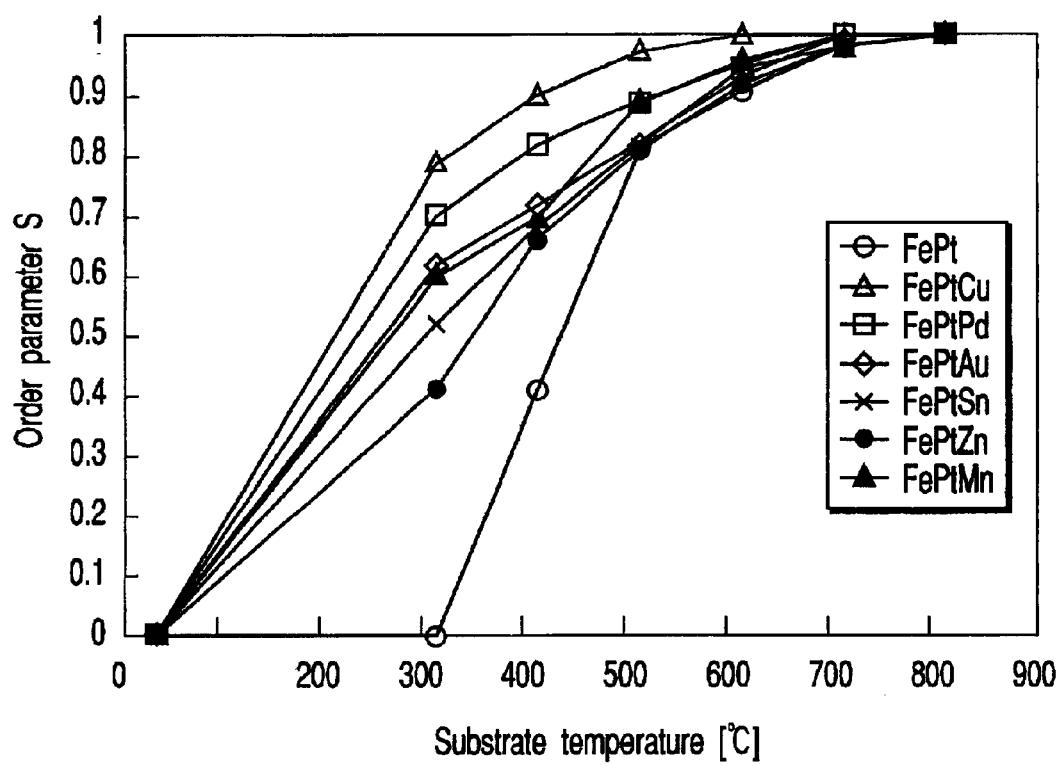
F I G. 10
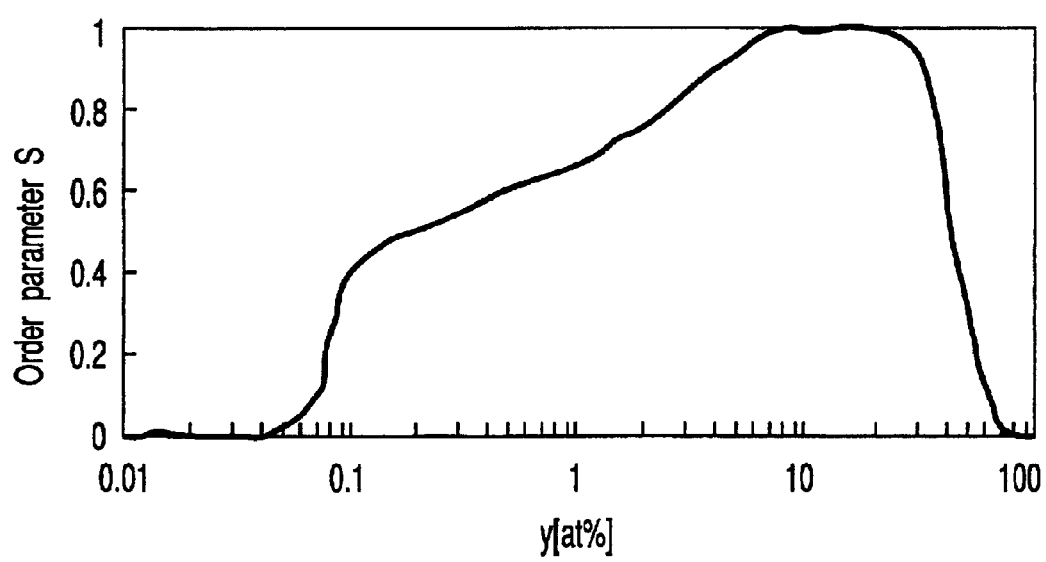
F I G. 11

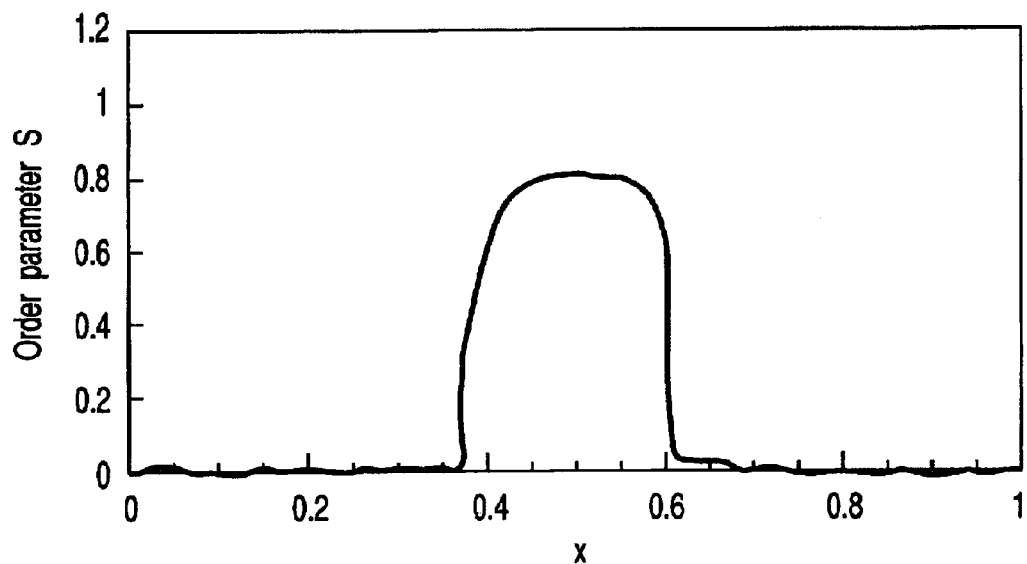
F I G. 14
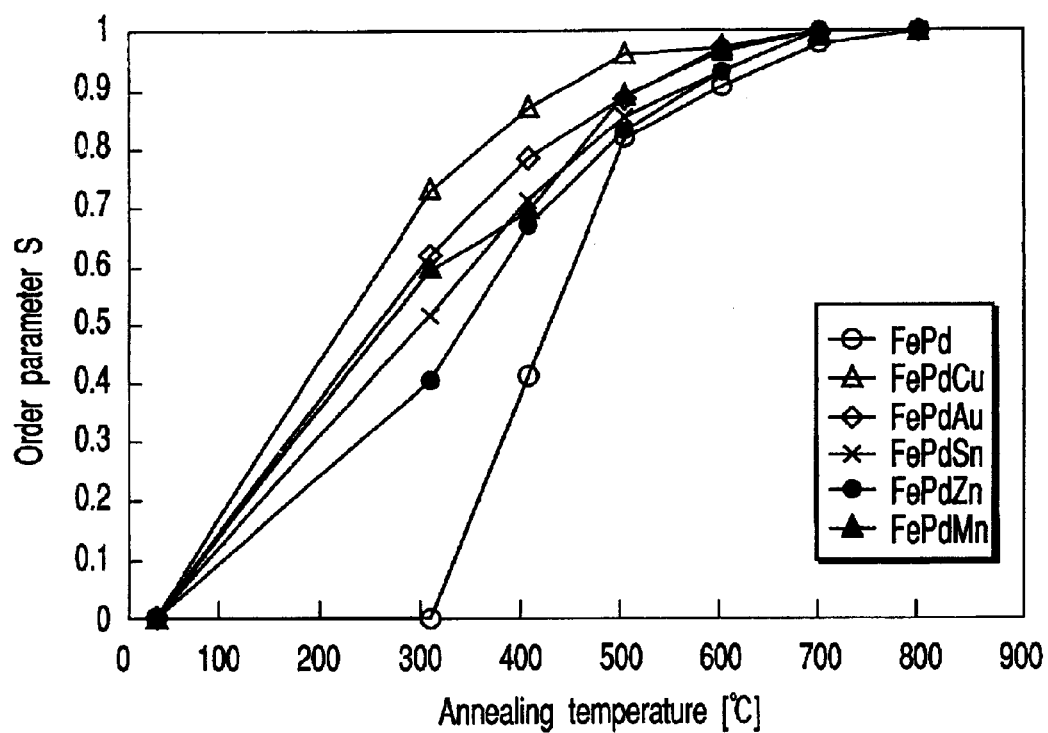
F I G. 15

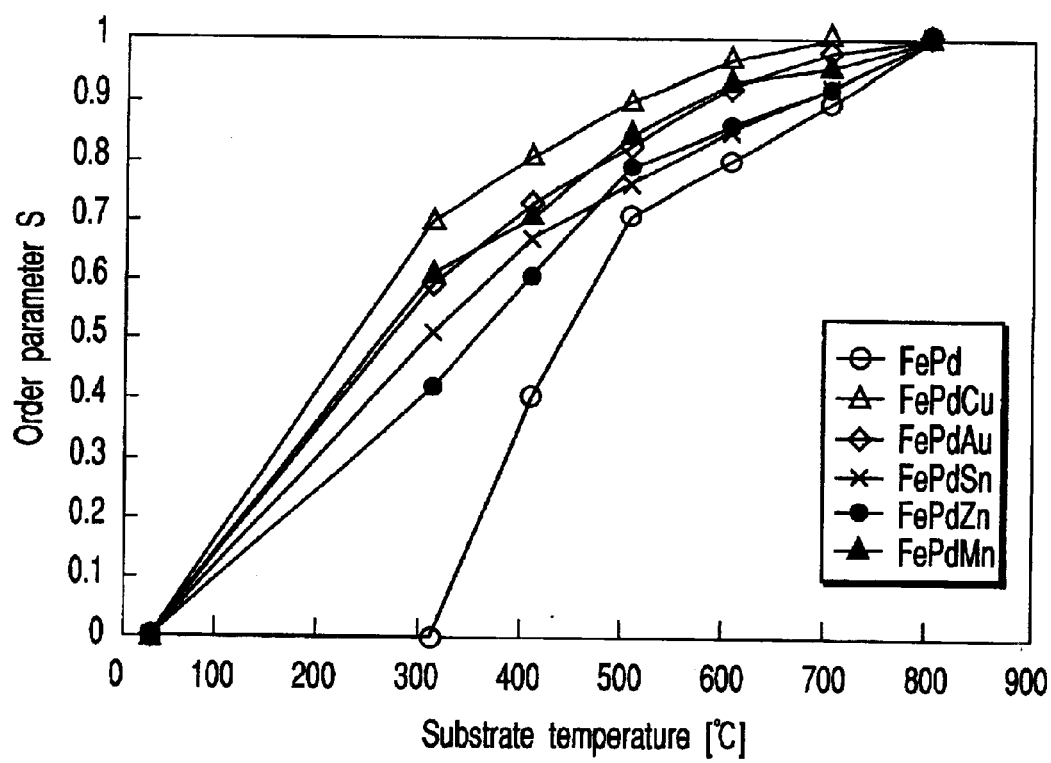
F I G. 20
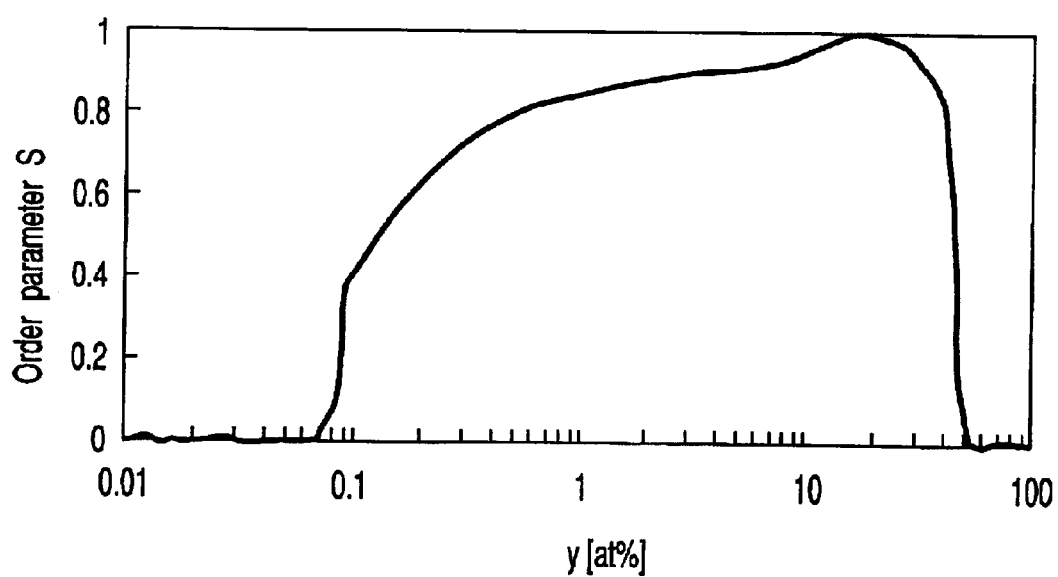
F I G. 21

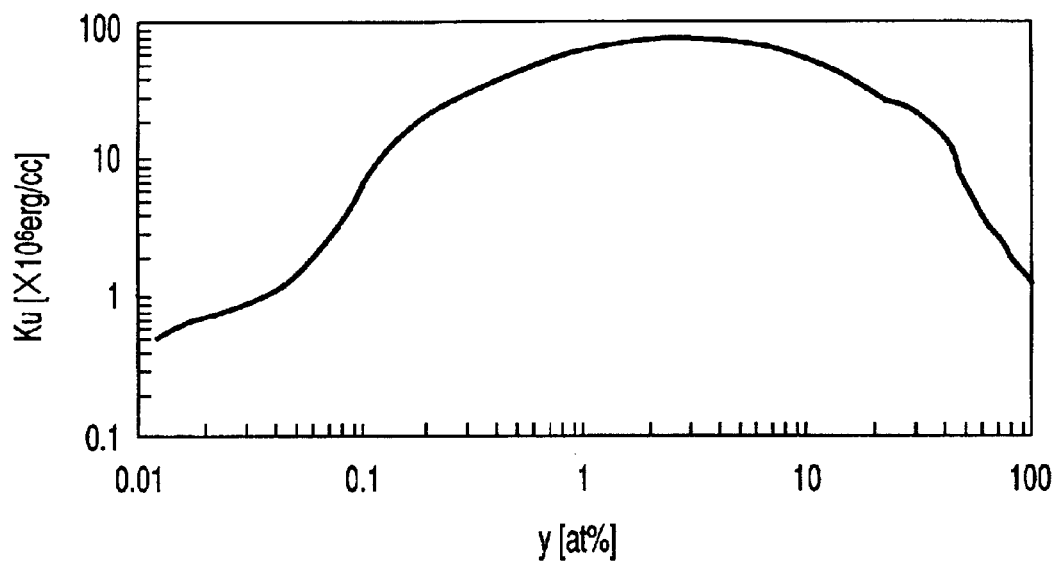
F I G. 22
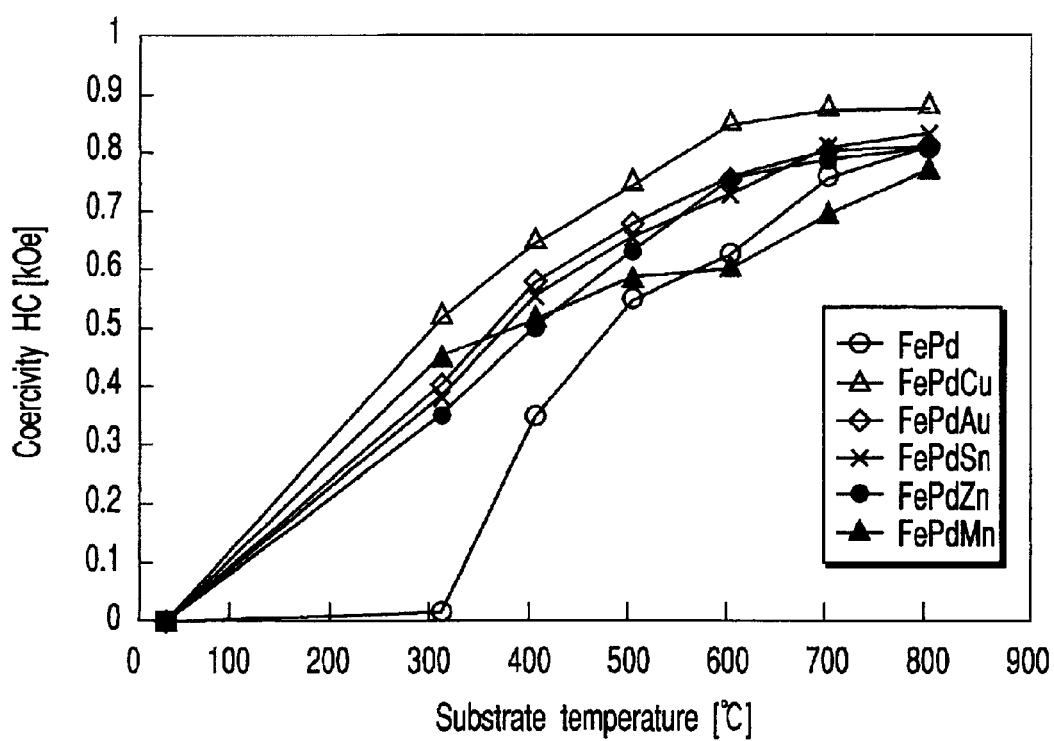
F I G. 23

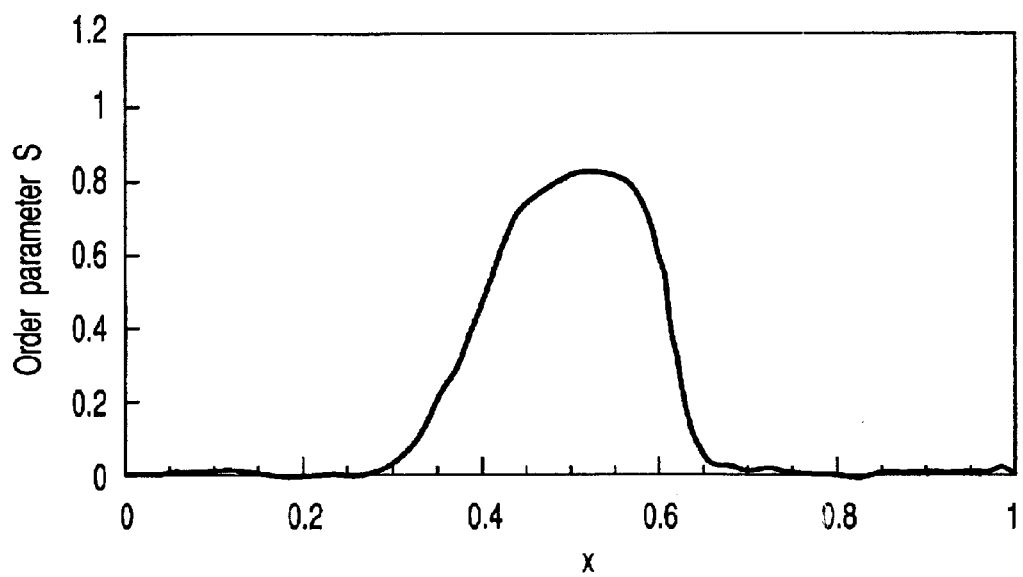
F I G. 24
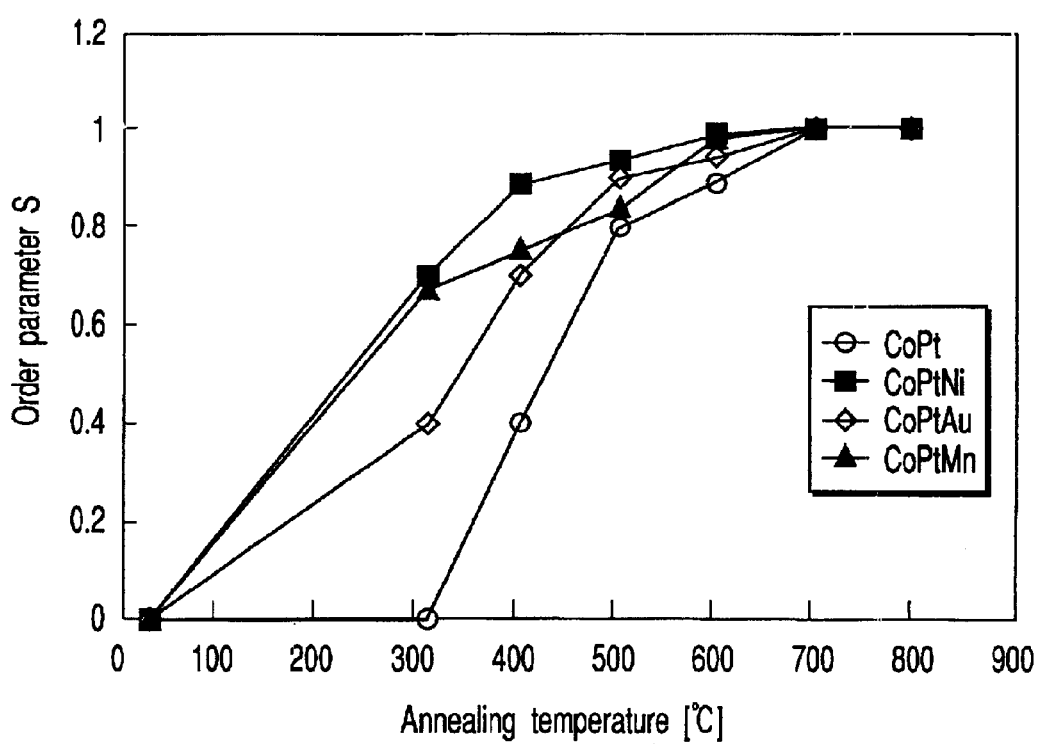
F I G. 25

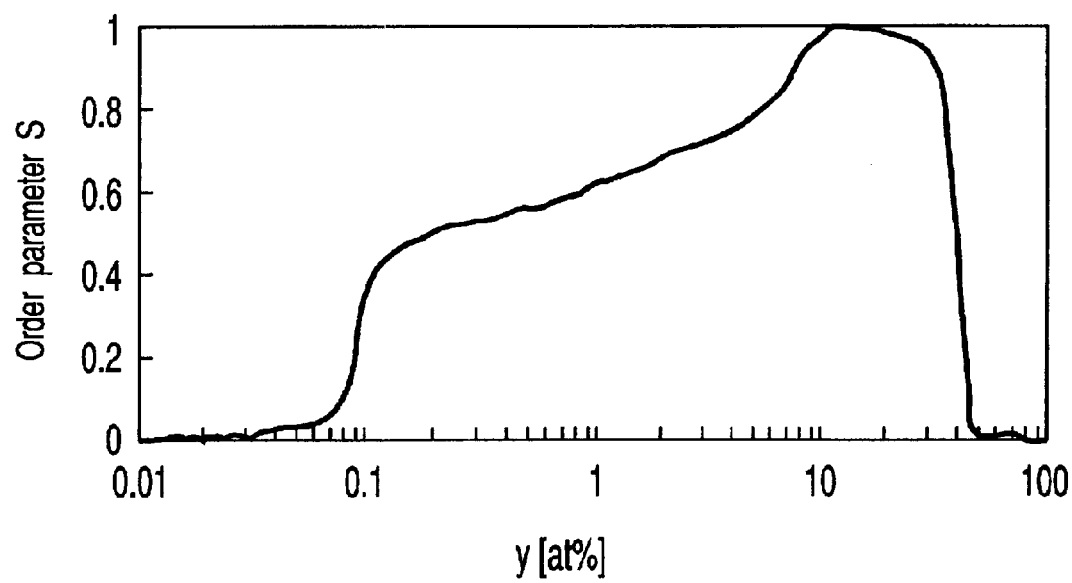
F I G. 26
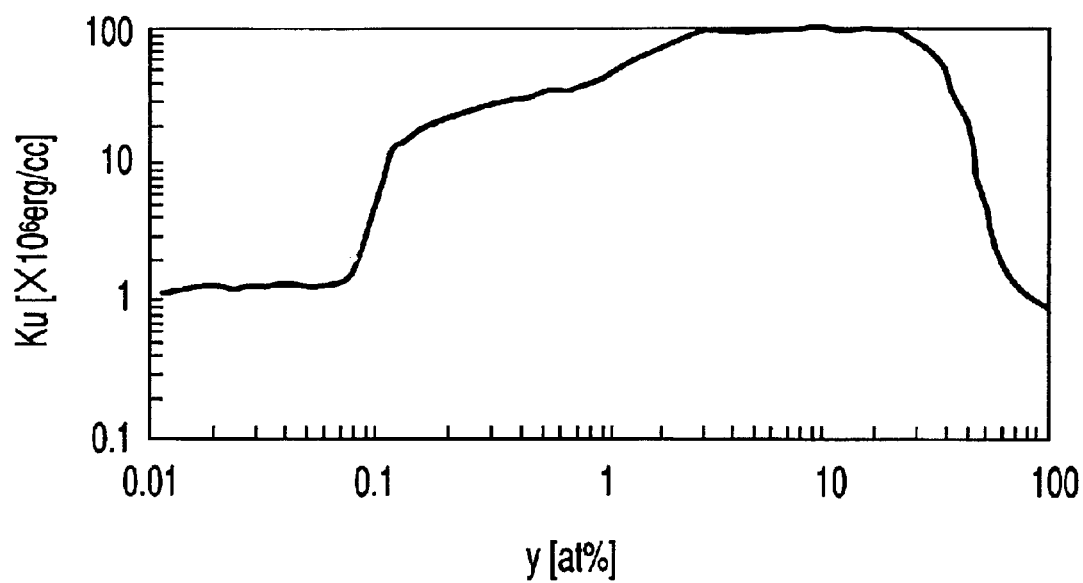
F I G. 27

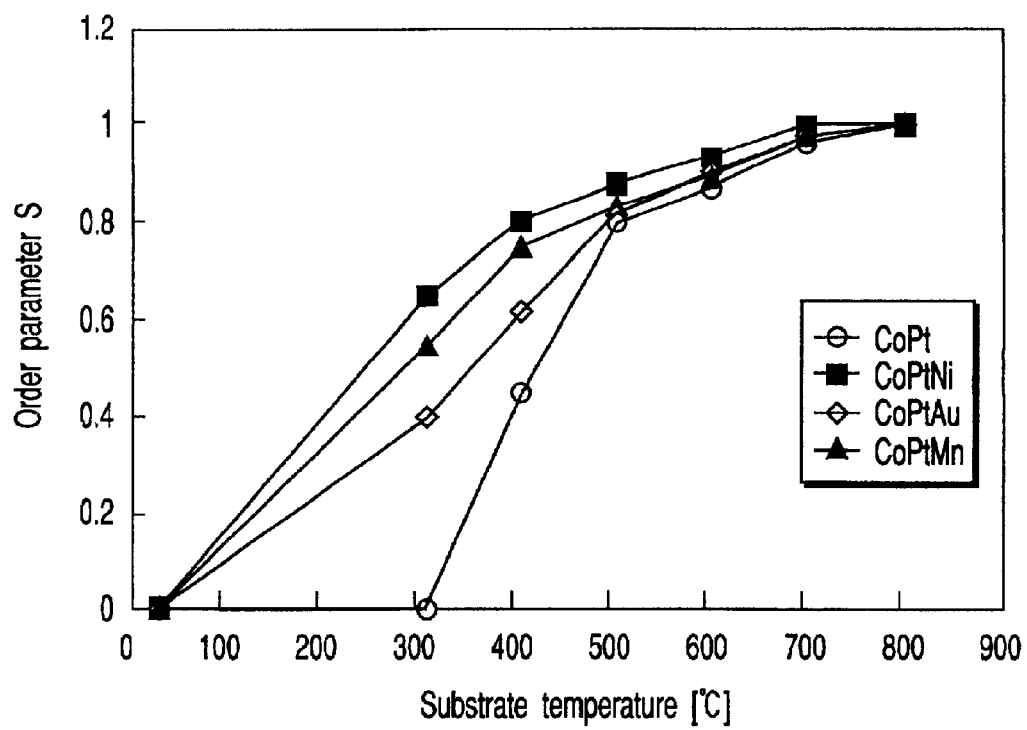
F I G. 30
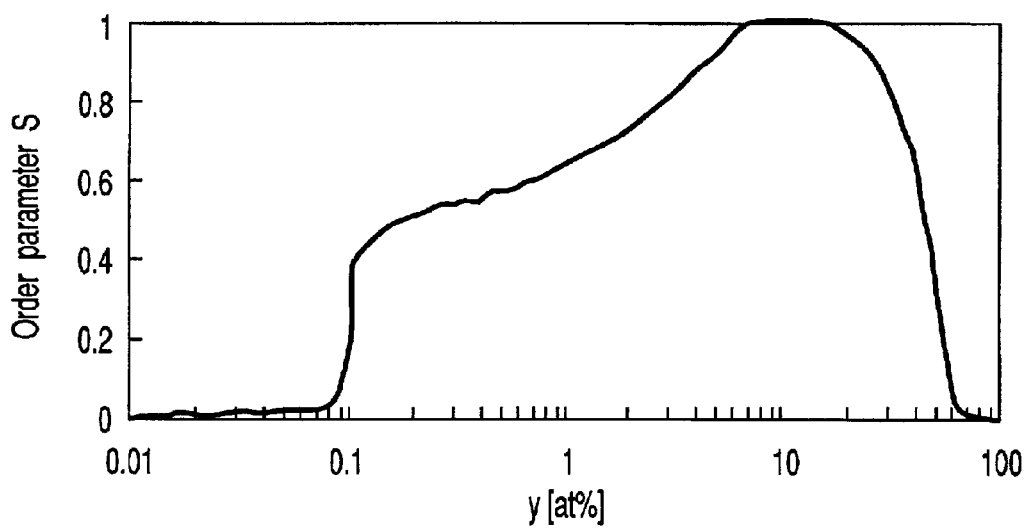
F I G. 31

MAGNETIC RECORDING MEDIUM WITH L10 CRYSTAL GRAINS INCLUDING THREE OR MORE ELEMENTS

CROSS-REFERENCE TO RELATED APPLICATIONS

This application is based upon and claims the benefit of priority from the prior Japanese Patent Application No. 2001-012119, filed Jan. 19, 2001, the entire contents of which are incorporated herein by reference.

BACKGROUND OF THE INVENTION

1. Field of the Invention

The present invention relates to a magnetic recording medium comprising a magnetic film suitable for use in high-density magnetic recording.

2. Description of the Related Art

In conformity with the recent trend to enhance the processing speed of computer, it is now demanded to enhance the speed and density of magnetic storage apparatus (HDD) that is designed to perform recording and reproducing of information. As the isolation and fineness of magnetic particles have been enhanced in the multigrain magnetic recording medium in responding to such a demand as described above, a problem is now raised in recent years with regard to deterioration of recorded magnetization due to thermal fluctuation. As a criterion for the thermal fluctuation resistance of magnetic recording medium, $KuV/kT$ (where Ku, V, k and T represent magnetic anisotropic energy density, activation volume in relation to magnetization reversal, Boltzmann constant, and absolute temperature, respectively) is generally employed. If the value of $KuV/kT$ is 80 or more, the magnetic recording medium is considered as being thermally stable. Assuming that the particle diameter of magnetic fine particle is made about 3 nm and thickness of the recording layer is made about 10 nm with the trend to enhance the density, a high Ku value of not less than $10^7$ erg/cc is required. As for the magnetic materials exhibiting a high Ku value at room temperature, ordered phase alloy such as FePt, FePd, and CoPt are known. Use of these materials for a magnetic layer makes it possible to enhance thermal fluctuation resistance considerably. These materials exhibit very high Ku in the c-axis direction only when they form a crystal structure called $L1_0$ (CuAu-I type) structure in which a face-centered tetragonal lattice (fct) is constructed such that the {001} plane is occupied by a magnetic element, and the {002} plane is occupied by a noble metal element (alternatively, the {002} plane is occupied by a magnetic element, and the {001} plane is occupied by a noble metal element). However, it is impossible to form an ordered phase exhibiting the aforementioned crystal structure only by a deposition method commonly employed in the manufacturing process of HDD medium such as sputtering and electron-beam evaporation. It is required, for forming substantially perfect ordered phase, to perform deposition under the condition where the substrate is heated to 500° C. or more, or to perform annealing at 500° C. or more after deposition of the film. However, such a high-temperature process is unsuitable to a usual deposition apparatus employed in a conventional manufacturing process of the HDD medium. Therefore, in order to put a magnetic recording medium employing an ordered phase alloy-based material into practical use, it is required for lowering the substrate temperature or annealing temperature.

As described above, although the ordered phase alloy is considered promising as a material for enhancing the thermal fluctuation resistance, the substrate temperature or annealing temperature required for forming the ordered phase should be lowered to put the ordered phase alloy into practical use.

BRIEF SUMMARY OF THE INVENTION

Therefore, an object of the present invention is to provide a magnetic recording medium capable of lowering a substrate temperature or an annealing temperature required for forming the ordered phase.

A magnetic recording medium according to an aspect of the present invention comprises: a substrate; an underlayer formed on the substrate; a magnetic layer formed on the underlayer, wherein the magnetic layer comprising crystal grains having (a) an $L1_0$ structure mainly including Fe and Pt, and (b) 0.1 to 50 atomic percent of at least one element selected from the group consisting of Cu, Au, Zn, Sn, Pd and Mn; and a protective layer formed on the magnetic layer.

A magnetic recording medium according to another aspect of the present invention comprises: a substrate; an underlayer formed on the substrate; a magnetic layer formed on the underlayer, wherein the magnetic layer comprising crystal grains having (a) an $L1_0$ structure mainly including Fe and Pd, and (b) 0.1 to 50 atomic percent of at least one element selected from the group consisting of Cu, Au, Zn, Sn and Mn; and a protective layer formed on the magnetic layer.

A magnetic recording medium according to still another aspect of the present invention comprises: a substrate; an underlayer formed on the substrate; a magnetic layer formed on the underlayer, wherein the magnetic layer comprising crystal grains having (a) an $L1_0$ structure mainly including Co and Pt, and (b) 0.1 to 50 atomic percent of at least one element selected from the group consisting of Ni, Au and Mn; and a protective layer formed on the magnetic layer.

BRIEF DESCRIPTION OF THE SEVERAL VIEWS OF THE DRAWING

FIG. 10 is a graph showing relationship between substrate temperature during deposition and order parameter in the magnetic recording medium of Example 1;

FIG. 11 is a graph showing relationship between amount of dissolved additive element and order parameter in the magnetic recording medium of Example 1;

FIG. 14 is a graph showing relationship between composition and order parameter in the magnetic recording medium of Example 2;

FIG. 15 is a graph showing relationship between annealing temperature and order parameter in the magnetic recording medium of Example 2;

FIG. 20 is a graph showing relationship between substrate temperature during deposition and order parameter in the magnetic recording medium of Example 2;

FIG. 21 is a graph showing relationship between amount of dissolved additive element and order parameter in the magnetic recording medium of Example 2;

FIG. 22 is a graph showing relationship between amount of dissolved additive element and Ku in the magnetic recording medium of Example 2;

FIG. 23 is a graph showing relationship between substrate temperature during deposition and coercivity in the magnetic recording medium of Example 2;

FIG. 24 is a graph showing relationship between composition and order parameter in the magnetic recording medium of Example 3;

FIG. 25 is a graph showing relationship between annealing temperature and order parameter in the magnetic recording medium of Example 3;

FIG. 26 is a graph showing relationship between amount of dissolved additive element and order parameter in the magnetic recording medium of Example 3;

FIG. 27 is a graph showing relationship between amount of dissolved additive element and Ku in the magnetic recording medium of Example 3;

FIG. 30 is a graph showing relationship between substrate temperature during deposition and order parameter in the magnetic recording medium of Example 3;

FIG. 31 is a graph showing relationship between amount of dissolved additive element and order parameter in the magnetic recording medium of Example 3;

DETAILED DESCRIPTION OF THE INVENTION

Figure 1:
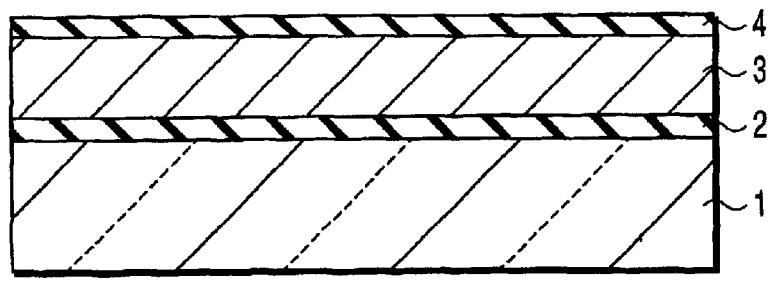
FIG. 1 is a cross-sectional view showing the magnetic recording medium according to one embodiment of the present invention.

FIG. 1 shows a magnetic recording medium according to one embodiment of the present invention. As shown in FIG. 1, the underlayer 2, the magnetic layer 3 and the protective layer 4 are successively laminated on the substrate 1.

The substrate employed in the embodiment is preferably formed of an amorphous or polycrystalline material such as glass, ceramics, etc. The polycrystalline substrate herein means a substrate that contains one or more crystal boundaries inside the crystal. Further, a material comprising a base made of a hard material and a metallic or ceramic layer deposited thereon may also be employed as the substrate. Among these substrates, preferred is a glass substrate having superior rigidity and flatness.

The underlayer employed in the embodiment reinforces function of the magnetic layer provided as a magnetic recording medium. Specifically, the underlayer is a thin film interposed between the magnetic layer and the substrate, and may be a layer formed of a single material or a multi-layered film comprising a plurality of layers. As long as a part of the underlayer satisfies the aforementioned conditions, the underlayer needs not be a continuous thin film.

The magnetic layer employed in the embodiment comprises crystal grains of ordered phase alloy having an $L1_0$ structure, and mainly including a magnetic metal element and noble metal element and further including at least one additive element dissolved in crystal grains. The $L1_0$ (CuAu-I type) structure referred to as a crystal structure in which a face-centered tetragonal lattice (fct) is constructed such that the {001} plane is occupied by a magnetic element, and the {002} plane is occupied by a noble metal element (alternatively, the {002} plane is occupied by a magnetic element, and the {001} plane is occupied by a noble metal element). By the way, the $L1_0$ structure is one of the crystal structures of binary alloy, so that a ternary or higher alloy in which an additive element is dissolved may be inapplicable to the definition of the $L1_0$ structure in a strict sense. However, as long as a sub-lattice including two types of elements, i.e. a magnetic element and a noble metal element, which are main components, is made into the $L1_0$ structure, the crystal structure is assumed to be the $L1_0$ structure in the present invention. By the way, the entire magnetic layer needs not to form the $L1_0$ structure completely. Namely, it suffices if the magnetic layer includes an ordered phase (the phase having the $L1_0$ structure) at a volume ratio of 1:1 or more relative to the disordered phase.

As described above, the magnetic layer contains a magnetic element, a noble element and an additive element. The additive element employed in the embodiment may have the following properties. Namely, employed is such an additive element that heat of mixing (enthalpy) between the additive element and the magnetic element exhibits the opposite sign to heat of mixing between the additive element and the noble element. One or more types of additive element may be employed. If the alloy system is assumed as a regular solution, the heat of mixing $\Delta H_{A-B}$ between A-B binary alloy can be expressed as follows:

$$\Delta H_{A-B} = x_A x_B \Omega_{AB}$$

where $x_A$ and $x_B$ represent the mole fractions of A and B, respectively; and $\Omega_{AB}$ is an interaction parameter.

Supposing that the bonding energies of A—A, B—B and A—B atomic pairs are $E_{AA}$, $E_{BB}$ and $E_{AB}$, respectively, $\Omega_{AB}$ is proportional to $\{E_{AB}-(E_{AB}+E_{BB})/2\}$. When $\Omega_{AB}>0$, i.e., $\Delta H_{A-B}>0$, A atom and B atom tend to repulse to each another, whereas when $\Omega_{AB}<0$, i.e., $\Delta H_{A-B}<0$, A atom and B atom tend to attract one another. Therefore, the additive element has a tendency that repulses one of the magnetic element and the noble element and attracts the other.

Figure 2:
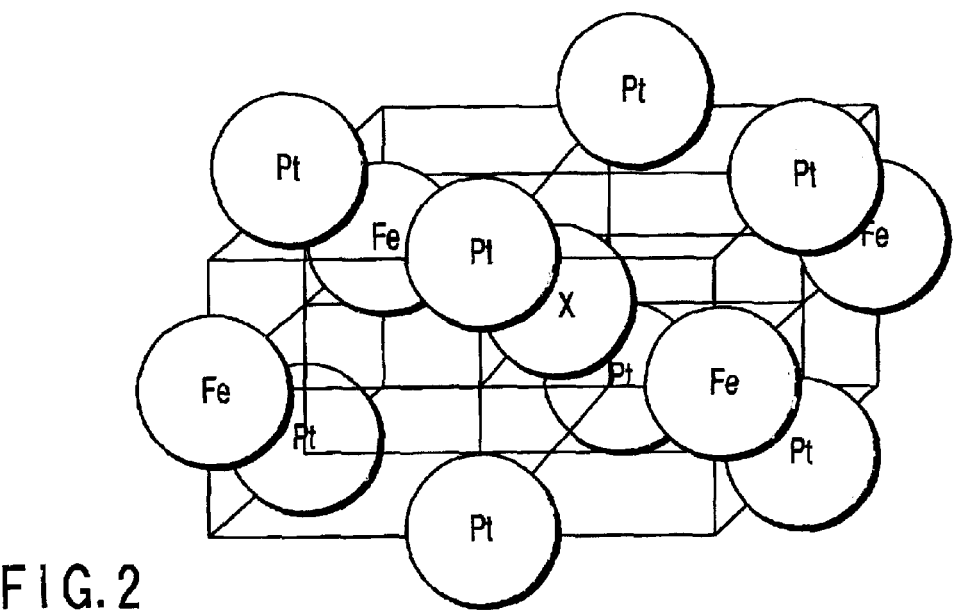
FIG. 2 is a diagram showing the crystal structure of an FePtX ordered phase.
Figure 3:
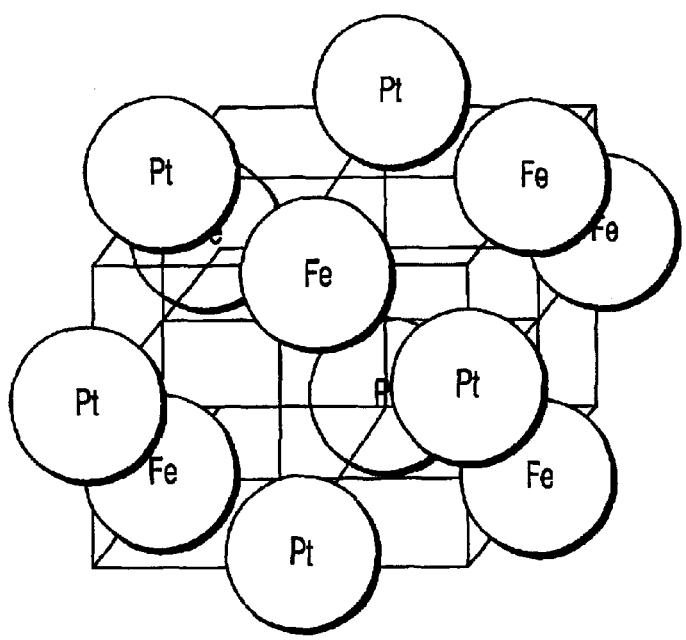
FIG. 3 is a diagram showing the crystal structure of an FePt disordered phase.

When an additive element X is added to the FePt crystal grains, the resultant crystal takes the $L1_0$ structure as shown in FIG. 2. As shown in FIG. 2, the A (Pt) atom exhibiting a tendency to attract the additive atom X is disposed at the nearest neighbor sites, and the B (Fe) atom exhibiting a tendency to repulse the additive atom X is disposed at the second nearest neighbor sites. On the other hand, FIG. 3 shows a structure in which the A (Pt) atom and the B (Fe) atom are disposed in a disordered manner. When the additive element X is added to the FePt crystal grains, the $L1_0$ structure shown in FIG. 2 is made more stable than the disordered structure shown in FIG. 3, thereby enhancing the driving force for the ordered phase. Therefore, when an additive element is added to the magnetic element in combination with the noble metal element, formation of ordered phase is promoted at a lower temperature as compared with the case where the additive element is not added.

Next, the constituent elements of the magnetic layer employed in the embodiments of the present invention will be explained in details as follows.

At least one element selected from the group consisting of Cu, Au, Zn, Sn, Pd and Mn is added to an Fe—Pt-based alloy. Any of these additive elements exhibit positive value in heat of mixing with Fe and negative value in heat of mixing with Pt. Therefore, formation of FePt ordered phase is promoted by the effect of the additive element, and a structure that the additive element is dissolved in crystal grains having a $L1_0$ structure including Fe and Pt as main components. The dissolved amount of the additive element added into the FePt crystal grains should preferably be in the range of 0.1 to 50 atomic percent. When the dissolved amount of the additive element is in the above range, the magnetic layer exhibits high Ku. More preferably, the dissolved amount of the additive element should be in the range of 3 to 20 atomic percent.

The composition ratio between Fe and Pt (Fe:Pt) should preferably be in the range of 4:6 to 6:4. When the composition ratio is in the above range, an ordered phase having a $L1_0$ structure can be formed easily. More preferably, the composition ratio of Fe:Pt should be in the range of 4.4:5.6 to 6:4. Dispersion of the grain diameter is about 50% in the case where the composition ratio of Fe:Pt is in the range of 4:6, and it decreases to about 25% in the case of 4.4:5.6 to 6:4.

Therefore, preferable composition of a crystal grain of FePt-based alloy is represented by the following formula:

$$(Fe_{1-x}Pt_x)_{100-y}M_y$$

where $x=0.4–0.6$, and $y=0.1–50$; more preferably $x=0.4–0.56$, and $y=3–20$.

At least one element selected from the group consisting of Cu, Au, Zn, Sn and Mn is added to an Fe—Pd-based alloy. Any of these additive elements exhibit positive value in heat of mixing with Fe and negative value in heat of mixing with Pd. Therefore, formation of FePd ordered phase is promoted by the effect of the additive element, and a structure that the additive element is dissolved in crystal grains having a $L1_0$ structure including Fe and Pd as main components. The dissolved amount of the additive element added into the FePd crystal grains should preferably be in the range of 0.1 to 50 atomic percent. When the dissolved amount of the additive element is in the above range, the magnetic layer exhibits high Ku. More preferably, the dissolved amount of the additive element should be in the range of 3 to 20 atomic percent. The composition ratio between Fe and Pd (Fe:Pd) should preferably be in the range of 4:6 to 6:4. When the composition ratio is in the above range, an ordered phase having a $L1_0$ structure can be formed easily. More preferably, the composition ratio of Fe:Pd should be in the range of 4.4:5.6 to 6:4. Dispersion of the grain diameter is about 50% in the case where the composition ratio of Fe:Pd is in the range of 4:6, and it decreases to about 25% in the case of 4.4:5.6 to 6:4.

Therefore, preferable composition of a crystal grain of FePd-based alloy is represented by the following formula:

$$(Fe_{1-x}Pd_x)_{100-y}M_y$$

where $x=0.4–0.6$, and $y=0.1–50$; more preferably $x=0.4–0.56$, and $y=3–20$.

At least one element selected from the group consisting of Ni, Au and Mn is added to a Co—Pt-based alloy. Any of these additive elements exhibit positive value in heat of mixing with Co and negative value in heat of mixing with Pt. Therefore, formation of CoPt ordered phase is promoted by the effect of the additive element, and a structure that the additive element is dissolved in crystal grains having a $L1_0$ structure including Co and Pt as main components. The dissolved amount of the additive element added into the CoPt crystal grains should preferably be in the range of 0.1 to 50 atomic percent. When the dissolved amount of the additive element is in the above range, the magnetic layer exhibits high Ku. More preferably, the dissolved amount of the additive element should be in the range of 3 to 20 atomic percent. The composition ratio between Co and Pt (Co:Pt) should preferably be in the range of 4:6 to 6:4. When the composition ratio is in the above range, an ordered phase having a $L1_0$ structure can be formed easily. More preferably, the composition ratio of Co:Pt should be in the range of 4.4:5.6 to 6:4. Dispersion of the grain diameter is about 50% in the case where the composition ratio of Fe:Pt is in the range of 4:6, and it decreases to about 25% in the case of 4.4:5.6 to 6:4.

Therefore, preferable composition of a crystal grain of FePt-based alloy is represented by the following formula:

$$(Co_{1-x}Pt_x)_{100-y}M_y$$

where $x=0.4–0.6$, and $y=0.1–50$; and more preferably $x=0.4–0.56$, and $y=3–20$.

Whether or not the magnetic layer is formed of an ordered structure can be confirmed by means of X-ray diffraction or electron beam diffraction. When the magnetic layer is formed of an ordered structure, a diffraction peak or a diffraction spot from planes such as (001), (110) and (003), which would not be appeared in a disordered fcc structure, can be observed.

By the way, Japanese Patent Unexamined Publication (Kokai) 9-320847 discloses an ordered phase alloy to which an element is added. However, the document substantially discloses alloys containing Fe and Co as magnetic elements. Moreover, although the amount of additive element is defined in the document, there is no description with respect to the position of the additive element in the alloy crystal. Namely, the amount of the additive element dissolved in the ordered alloy and the amount of the additive element precipitated in crystal boundaries are not distinguished. In order to promote formation of the ordered alloy phase, the additive element is required to be dissolved in the ordered alloy, so that it is impossible to promote formation of the ordered phase only under the conditions disclosed in the document. Further, the document also contains additive elements that rather disturb formation of the ordered phase. Therefore, the document does not suggest any effect to lower the substrate temperature or annealing temperature required for forming the ordered phase.

According to the embodiments of the present invention, the amount of the additive element dissolved in ordered phase alloy crystals is specified. In the case, the amount of dissolved additive element means the amount of additive element exists in crystal grains of ordered phase alloy, which does not include the additive element exists in, for example, grain boundaries. The identification of the elements as well as the measurement of the amount of the additive element exists in crystal grains of the ordered alloy can be performed by means of analytical transmission electron microscope (TEM).

Although the thickness of the magnetic layer in the embodiments of the present invention can be determined depending on the requirement for a specific system, it is generally preferable that the thickness of the magnetic layer is 200 nm or less, more preferably 50 nm or less, and still more preferably 20 nm or less. As the thickness of the magnetic layer becomes thin, crystal grains are made fine, leading to improvement in recording resolution. However, if the thickness of the magnetic layer is thinner than 0.5 nm, it is difficult to make the magnetic layer into a continuous film, which is unsuitable for use in a magnetic recording medium.

Examples of methods of forming various thin films constituting the magnetic recording medium according to embodiments of the present invention are vacuum evaporation, various types of sputtering methods, a chemical vapor deposition, and laser abrasion. It is particularly preferable that the magnetic layer is deposited by sputtering under a pressure of 5 mTorr or more. When the underlayer or the magnetic layer is formed, a bias sputtering method with applying RF or DC power to the substrate or a method of irradiating the substrate with ions or neutrons may be employed. These processes may be performed not only during deposition but also after deposition of before deposition. Among the various methods described above, DC sputtering is preferred because it needs only short deposition time and suitable for mass production.

In a method for manufacturing a magnetic recording medium according to the embodiments of the present invention, it is preferable to deposit a magnetic layer by DC sputtering.

It is preferable to employ an alloy target formed of a magnetic metal element, a noble metal element and an additive element, which are constituent elements of a desired ordered alloy, for performing DC sputtering. It is also preferable to employ a target of a magnetic metal element, a target of a noble metal element and a target of an additive element, which are mounted on separate cathodes, and to perform DC co-sputtering. These methods are advantageous to dissolve the magnetic metal element, the noble metal element and the additive element. However, when an insulating element or compound is employed for a magnetic layer or other layer, RF sputtering may be employed. In addition, the substrate is heated to a temperature ranging from 200 to 700° C. during or before deposition, or the magnetic layer is annealed at a temperature ranging from 200 to 700° C. after deposition. As described above, since the ordered phase can be easily formed in the magnetic layers according to embodiments of the present invention, the substrate temperature during or before deposition or the annealing temperature after deposition can be lowered to a range of 200 to 400° C., which is lower than that in the conventional method. By using above methods, a magnetic layer comprising ordered alloy crystal grains having an L1$_0$ structure, in which a magnetic metal element, a noble metal element and an additive element, can be easily formed.

EXAMPLES

Next, specific examples of the present invention will be explained.

Example 1

An underlayer formed of MgO and having a thickness of 10 nm, a magnetic layer having a thickness of 50 nm and a protective layer formed of carbon and having a thickness of 5 nm were successively deposited on the glass substrate. The deposited magnetic layer was $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ or $(Fe_{1-x}Pt_x)_{100-y}Mn_y$. The MgO underlayer was formed by means of RF sputtering, while the magnetic layer and the protective layer were formed by means of DC sputtering. Specifically, the magnetic layer was deposited by means of binary or ternary co-sputtering under a pressure of 5 mTorr or more, whose composition was controlled by changing the power applied to each of the targets. During deposition, the substrate was not heated. After deposition, the resultant structure was subjected to annealing in a hydrogen atmosphere for one hour at a temperature ranging from 300 to 700° C.

After annealing, order parameter S of ordered alloy crystal constituting a magnetic layer was evaluated by means of X-ray diffraction. Specifically, order parameter S was evaluated on the basis of the integrated intensities of diffraction peaks attributed to (001) and (002) planes obtained by X-ray diffraction, by way of the following formula:

$$S=0.72(I_{001}/I_{002})^{1/2}$$

where $I_{001}$ and $I_{002}$ represent the integrated intensities of the diffraction peaks attributed to the (001) and (002) planes, respectively.

After annealing of the magnetic layer, the amount of the additive element exists in the ordered alloy crystal grains was measured by way of local analysis by EDX using a transmission electron microscope (TEM), thereby determining the value of x [at%] and the dissolved amount y [at%] of the additive element in crystal grains. Magnetic anisotropic energy Ku of the recording medium was measured by making use of a torque magnetometer at room temperature. Coercivity in a perpendicular direction to the film surface of the recording medium was measured by making use of SQUID at room temperature.

Figure 4:
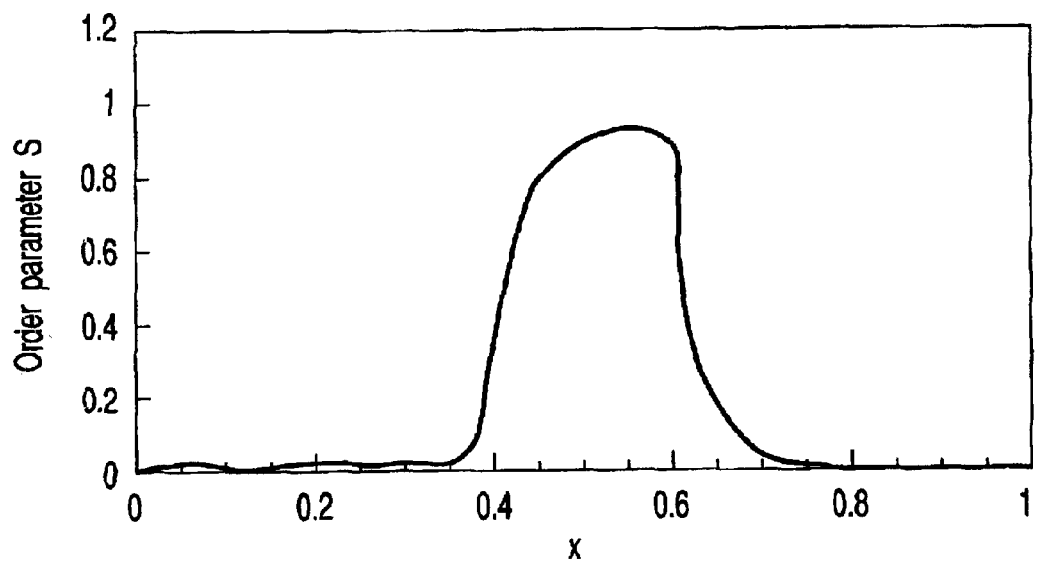
FIG. 4 is a graph showing relationship between composition and order parameter in the magnetic recording medium of Example 1.

FIG. 4 shows relationship between composition x and order parameter S of ordered alloy crystal in the $Fe_{1-x}Pt_x$ magnetic layer annealed at 500° C. As a result, it was found that the order parameter of the ordered alloy crystal is enhanced in the range of $0.4 \leq x \leq 0.6$. Similar tendencies as described above were also found, irrespective of the amount of dissolved additive element, in each of the magnetic layers of: $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$.

Figure 5:
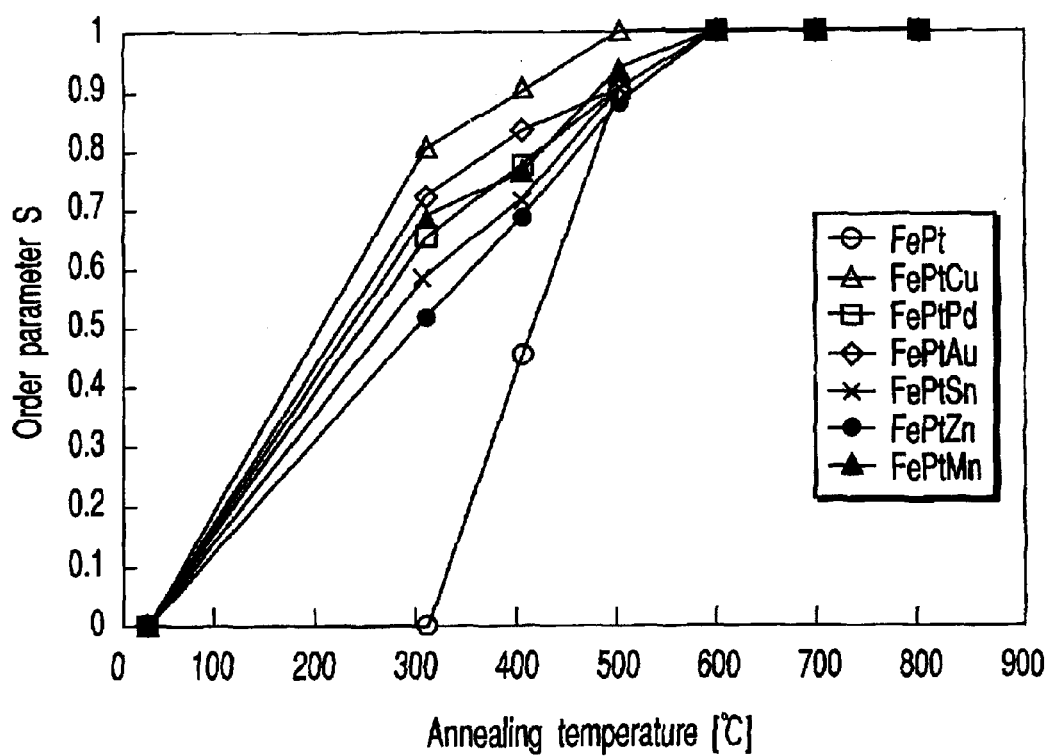
FIG. 5 is a graph showing relationship between annealing temperature and order parameter in the magnetic recording medium of Example 1.

FIG. 5 shows relationship between annealing temperature and order parameter S of ordered alloy crystal with respect to the magnetic layers of: $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$, where x=0.5 and the dissolved amount of the additive element y=6 at%. As can be seen from FIG. 5, in the case of the FePt magnetic layer, formation of ordered phase was not promoted when the annealing temperature was set to 300° C., and was promoted when the annealing temperature was raised to 400° C. or more. On the other hand, in all of the magnetic layers having a composition that an additive element was added to FePt, formation of ordered phase was promoted when the annealing temperature was set to 300° C. or more. In this way, it was found that addition of an additive element promotes order of crystal grains at a relatively low annealing temperature.

Figure 6:
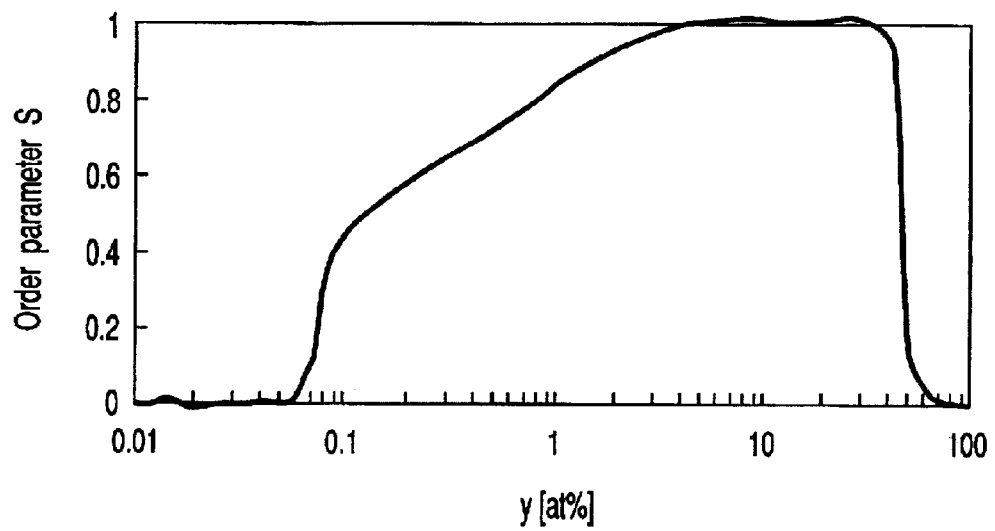
FIG. 6 is a graph showing relationship between amount of dissolved additive element and order parameter in the magnetic recording medium of Example 1.

FIG. 6 shows relationship between dissolved Cu amount y [at%] in crystal grains and order parameter S of ordered alloy crystal with respect to $(Fe_{1-x}Pt_x)_{100-y}Cu_y$ magnetic layer, where x=0.5, which was annealed at 300° C. As a result, it was confirmed that the order parameter was enhanced in the range of $0.1 \leq y \leq 50$. In particular, remarkable enhancement effect in the order parameter was obtained in the range of $3 \leq y \leq 20$. Similar results as described above were also obtained in the case of other additive elements.

Figure 7:
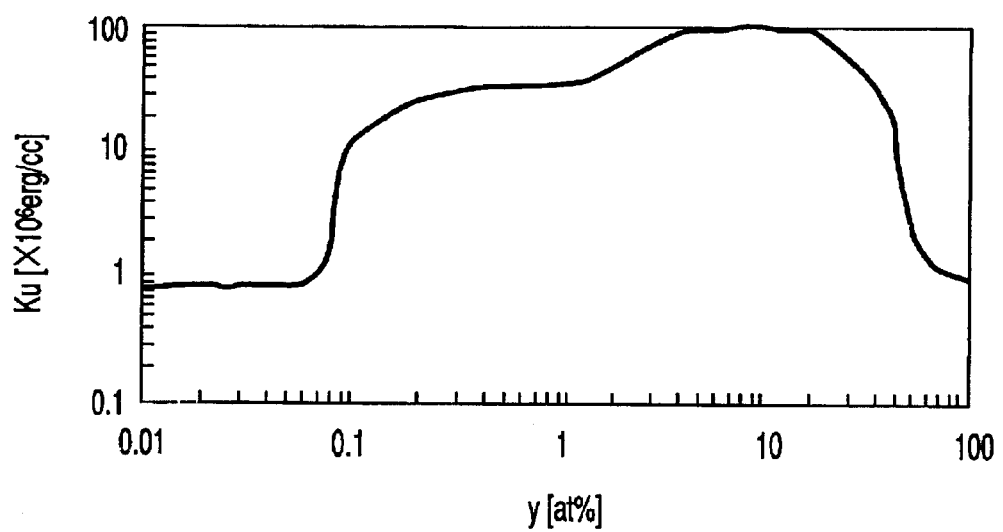
FIG. 7 is a graph showing relationship between amount of dissolved additive element and Ku in the magnetic recording medium of Example 1.

FIG. 7 shows relationship between dissolved Cu amount y [at%] in crystal grains and Ku in the direction perpendicular to the substrate surface with respect to $(Fe_{1-x}Pt_x)_{100-y}Cu_y$ magnetic layer, where x=0.5, which was annealed at 300° C. As a result, a high Ku value of $1 \times 10^7$ erg/cc or more was obtained in the range of $0.1 \leq y \leq 50$, in particular, $3 \leq y \leq 20$. Similar results as described above were also obtained in other magnetic layers of: $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$.

Figure 8:
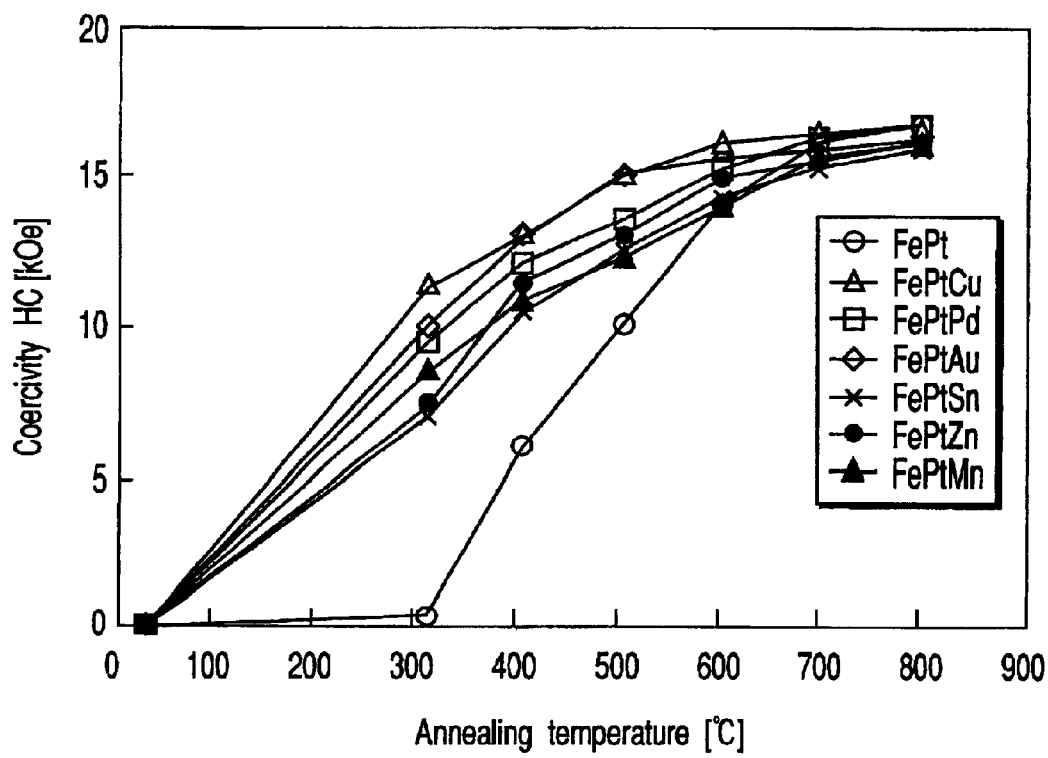
FIG. 8 is a graph showing relationship between annealing temperature and coercivity in the magnetic recording medium of Example 1.

FIG. 8 shows relationship between annealing temperature and coercivity with respect to the magnetic layers of: $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn^y$, $(Fe_{1-x}Pt_x)_{100-y}Zn_y$ and $(Fe_{1-x}Pt_x)_{100-y}Mn^y$, where x=0.5 and y=6 at%. As can be seen from FIG. 8, coercivity of 7 kOe or more was obtained under an annealing temperature of 300° C. or more in all of the magnetic layers other than $Fe_{1-x}Pt_x$. Similar tendencies as shown in FIG. 8 were also found in all of the magnetic layers other than $Fe_{1-x}Pt_x$ in the range of $0.4 \leq x \leq 0.6$ and $0.1 \leq y \leq 50$.

Next, an underlayer formed of MgO and having a thickness of 10 nm, a magnetic layer having a thickness of 50 nm and a protective layer formed of carbon and having a thickness of 5 nm were successively deposited on the surface of glass substrate, under the condition that the glass substrate was heated to various temperatures in the range of 300 to 700° C. during deposition. The deposited magnetic layer was $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ or $(Fe_{1-x}Pt_x)_{100-y}Mn_y$. Annealing after deposition was not performed. After deposition, the resultant magnetic layers were evaluated by way of the same methods as described above.

Figure 9:
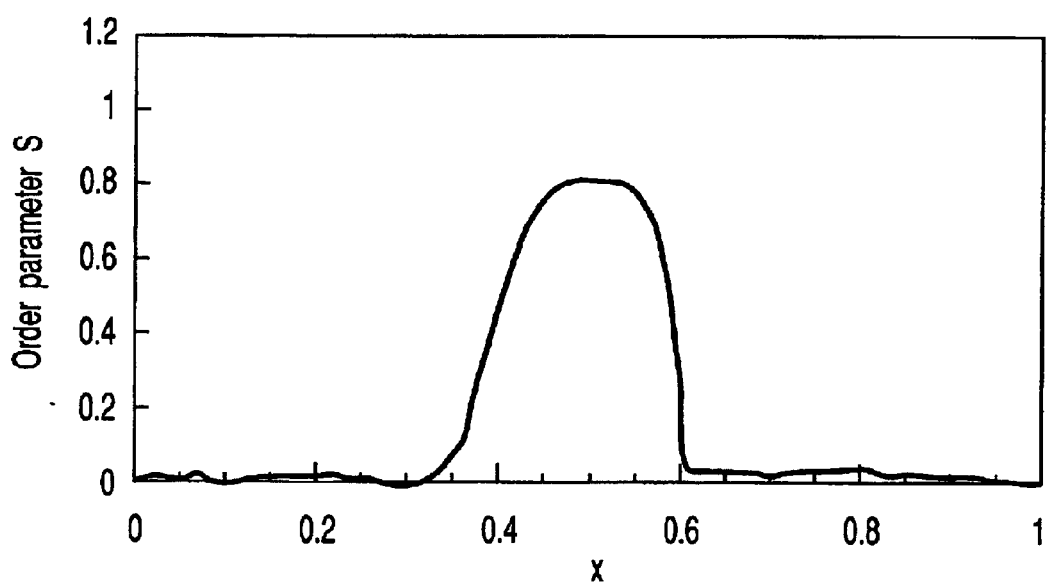
FIG. 9 is a graph showing relationship between composition and order parameter in the magnetic recording medium of Example 1.

FIG. 9 shows relationship between composition x and order parameter S of ordered alloy crystal with respect to $Fe_{1-x}Pt_x$ magnetic layer deposited under the condition of substrate temperature of 500° C. As a result, it was found that the order parameter of the ordered alloy crystal is enhanced in the range of $0.4 \leq x \leq 0.6$. Similar tendencies as described above were also found, irrespective of the amount of dissolved additive element, in each of the magnetic layers of: $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$.

FIG. 10 shows relationship between substrate temperature during deposition and order parameter S of ordered alloy crystal with respect to the magnetic layers of: $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$, where x=0.5 and y=6 at%. As can be seen from FIG. 10, in the case of the FePt magnetic layer, formation of ordered phase was not promoted when the substrate temperature was set to 300° C., and was promoted when the substrate temperature was raised to 400° C. or more. On the other hand, in all of the magnetic layers having a composition that an additive element was added to FePt, formation of ordered phase was promoted when the substrate temperature was set to 300° C. or more. In this way, it was found that addition of an additive element promotes ordering of crystal grains at a relatively low substrate temperature.

FIG. 11 shows relationship between dissolved Cu amount y [at%] in crystal grains and order parameter S of ordered alloy crystal with respect to $(Fe_{1-x}Pt_x)_{100-y}Cu_y$ magnetic layer, where x=0.5, which was deposited under the condition of substrate temperature of 300° C. As a result, it was confirmed that the order parameter was enhanced in the range of $0.1 \leq y \leq 50$. In particular, remarkable enhancement effect in the order parameter was obtained in the range of $3 \leq y \leq 20$. Similar results as described above were also obtained in the case of other additive elements.

Figure 12:
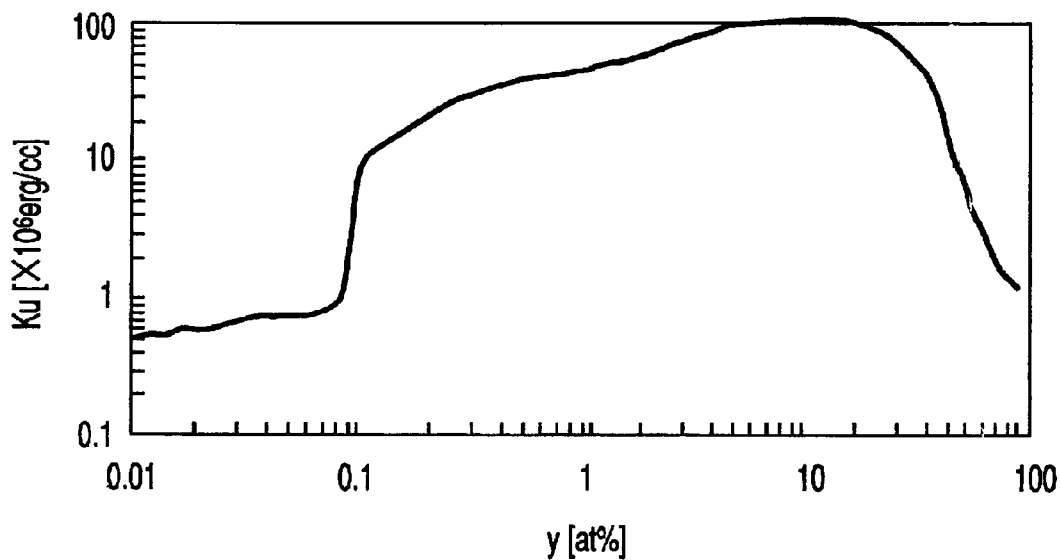
FIG. 12 is a graph showing relationship between amount of dissolved additive element and Ku in the magnetic recording medium of Example 1.

FIG. 12 shows relationship between dissolved Cu amount y [at%] in crystal grains and Ku in the direction perpendicular to the substrate surface with respect to $(Fe_{1-x}Pt_x)_{100-y}Cu_y$ magnetic layer, where x=0.5, which was deposited under the condition of substrate temperature of 300° C. As a result, a high Ku value of $1 \times 10^7$ erg/cc or more was obtained in the range of $0.1 \leq y \leq 50$, in particular, $3 \leq y \leq 20$. Similar results as described above were also obtained in other magnetic layers of: $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$.

Figure 13:
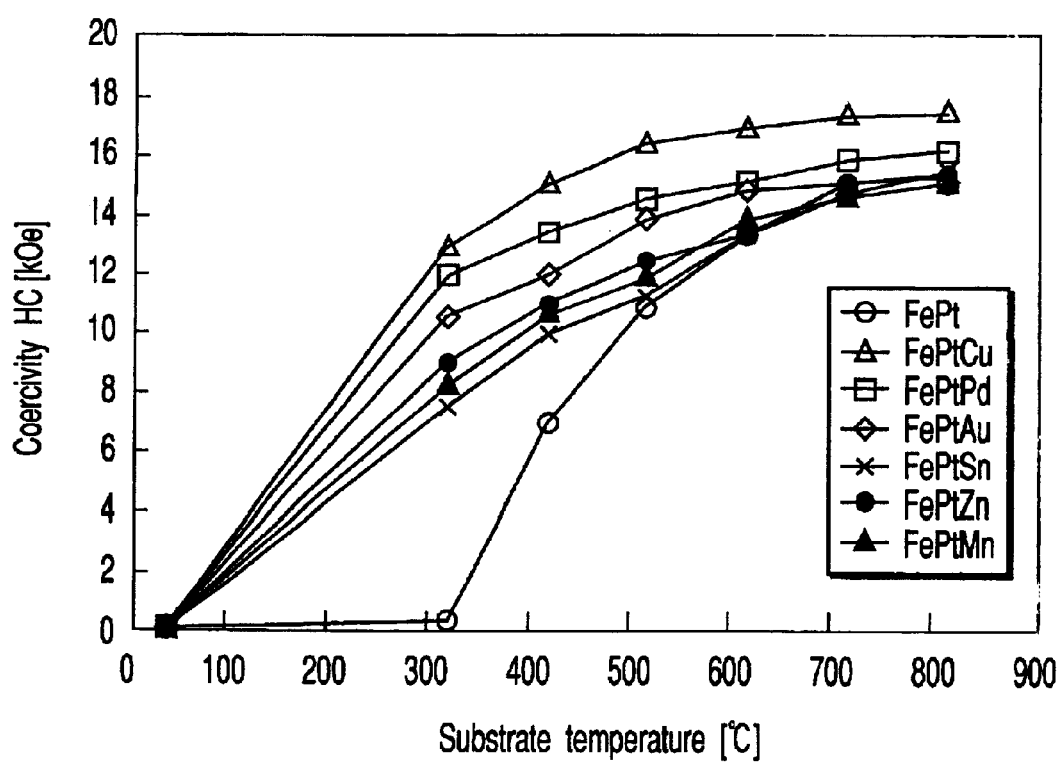
FIG. 13 is a graph showing relationship between substrate temperature during deposition and coercivity in the magnetic recording medium of Example 1.

FIG. 13 shows relationship between substrate temperature during deposition and coercivity with respect to the magnetic layers of: $Fe_{1-x}Pt_x$, $(Fe_{1-x}Pt_x)_{100-y}Cu_y$, $(Fe_{1-x}Pt_x)_{100-y}Pd_y$, $(Fe_{1-x}Pt_x)_{100-y}Au_y$, $(Fe_{1-x}Pt_x)_{100-y}Sn_y$, $(Fe_{1-x}Pt_x)_{100-y}Zn_y$ and $(Fe_{1-x}Pt_x)_{100-y}Mn_y$, where x=0.5 and y=6 at%. As can be seen from FIG. 13, coercivity of 7 kOe or more was obtained where the substrate temperature was 300° C. or more in all of the magnetic layers other than $Fe_{1-x}Pt_x$. Similar tendencies as shown in FIG. 13 were also found in all of the magnetic layers other than $Fe_{1-x}Pt_x$ in the range of $0.4 \leq x \leq 0.6$ and $0.1 \leq y \leq 50$.

Next, an Fe—Pt—M magnetic layer having a thickness of 100 nm, 50 nm or 30 nm under similar conditions as described above, and then an average diameter of crystal grains was determined with TEM observation. As a result, average diameters of crystal grains contained in the magnetic layers having a thickness of 100 nm, 50 nm and 30 nm were 100 nm, 20 nm and 10 nm, respectively. Since recording resolution is improved if the grain diameter is as small as possible, a thinner magnetic layer is advantageous. Note that, the magnetic layers having a thickness of 100 nm or 30 nm exhibited similar characteristics to those of aforementioned magnetic layers having a thickness of 50 nm, except the average grain diameter.

Example 2

An underlayer formed of MgO and having a thickness of 10 nm, a magnetic layer having a thickness of 50 nm and a protective layer formed of carbon and having a thickness of 5 nm were successively deposited on the surface of glass substrate. The deposited magnetic layer was $Fe_{1-x}Pd_x$, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ or $(Fe_{1-x}Pd_x)_{100-y}Mn_y$. The MgO underlayer was formed by means of RF sputtering, while the magnetic layer and the protective layer were formed by means of DC sputtering. Specifically, the magnetic layer was deposited using a binary or ternary alloy target under a pressure of 5 mTorr or more, where the composition of the magnetic layer was controlled by adjusting the composition of the target. During deposition, the substrate was not heated. After deposition, the resultant structure was subjected to annealing in a hydrogen atmosphere for one hour at a temperature ranging from 300 to 700° C.

After annealing, the composition and magnetic characteristics of the magnetic layer were measured following the same methods as described in Example 1. Order parameter S was evaluated on the basis of the integrated intensities of diffraction peaks attributed to (001) and (002) planes obtained by X-ray diffraction, by way of the following formula:

$$S = 1.23(I_{001}/I_{002})^{1/2}$$

where $I_{001}$ and $I_{002}$ represent the integrated intensities of the diffraction peaks attributed to the (001) and (002) planes, respectively.

FIG. 14 shows relationship between composition x and order parameter S of ordered alloy crystal in the $Fe_{1-x}Pd_x$ magnetic layer annealed at 500° C. As a result, it was found that the order parameter of the ordered alloy crystal is enhanced in the range of $0.4 \leq x \leq 0.6$. Similar tendencies as described above were also found, irrespective of the amount of dissolved additive element, in each of the magnetic layers of: $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ and $(Fe_{1-x}Pd_x)_{100-y}Mn_y$.

FIG. 15 shows relationship between annealing temperature and order parameter S of ordered alloy crystal with respect to the magnetic layers of: FePd, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ and $(Fe_{1-x}Pd_x)_{100-y}Mn_y$, where x=0.5 and the dissolved amount of the additive element y=6 at%. As can be seen from FIG. 15, in the case of the FePd magnetic layer, formation of ordered phase was not promoted when the annealing temperature was set to 300° C., and was promoted when the annealing temperature was raised to 400° C. or more. On the other hand, in all of the magnetic layers having a composition that an additive element was added to FePd, formation of ordered phase was promoted when the annealing temperature was set to 300° C. or more. In this way, it was found that addition of an additive element promotes order of crystal grains at a relatively low annealing temperature.

Figure 16:
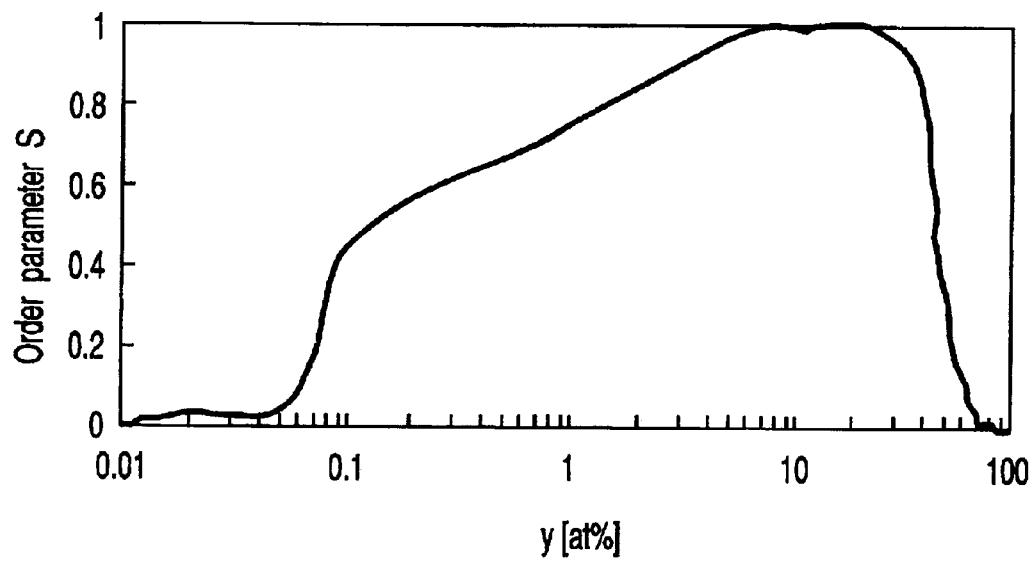
FIG. 16 is a graph showing relationship between amount of dissolved additive element and order parameter in the magnetic recording medium of Example 2.

FIG. 16 shows relationship between dissolved Cu amount y [at%] in crystal grains and order parameter S of ordered alloy crystal with respect to $(Fe_{1-x}Pd_x)_{100-y}Cu_y$ magnetic layer, where x=0.5, which was annealed at 300° C. As a result, it was confirmed that the order parameter was enhanced in the range of $0.1 \leq y \leq 50$. In particular, remarkable enhancement effect in the order parameter was obtained in the range of $3 \leq y \leq 20$. Similar results as described above were also obtained in the case of other additive elements.

Figure 17:
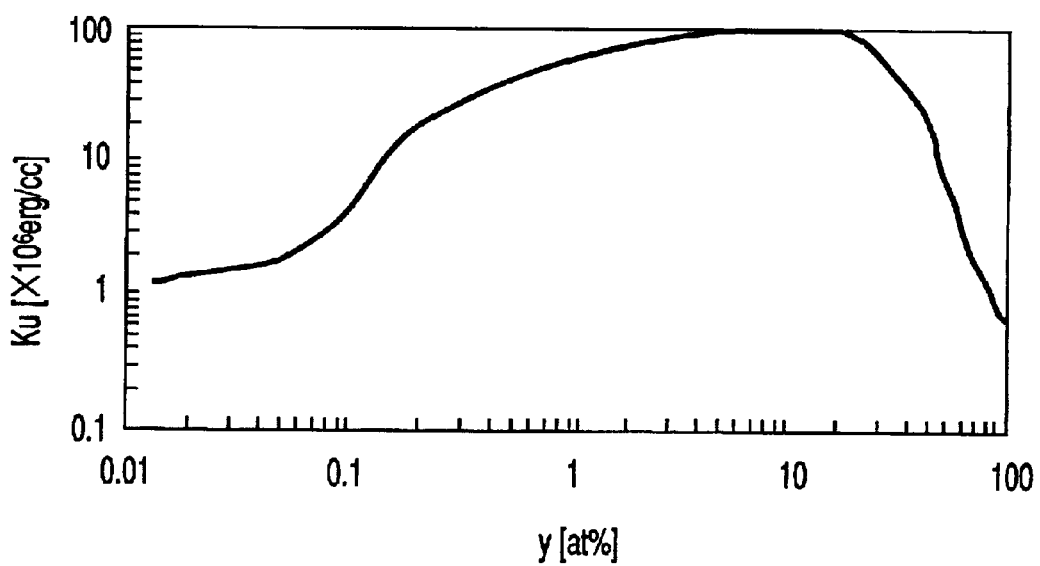
FIG. 17 is a graph showing relationship between amount of dissolved additive element and Ku in the magnetic recording medium of Example 2.

FIG. 17 shows relationship between dissolved Cu amount y [at%] in crystal grains and Ku in the direction perpendicular to the substrate surface with respect to $(Fe_{1-x}Pd_x)_{100-y}Cu_y$ magnetic layer, where x=0.5, which was annealed at 300° C. As a result, a high Ku value of $1 \times 10^7$ erg/cc or more was obtained in the range of $0.1 \leq y \leq 50$, in particular, $3 \leq y \leq 20$. Similar results as described above were also obtained in other magnetic layers of: $(Fe_{1-x}Pd_x)_{100-y}Au_y$, $(Fe_{1-x}Pd_x)_{100-y}Sn_y$, $(Fe_{1-x}Pd_x)_{100-y}Zn_y$ and $(Fe_{1-x}Pd_x)_{100-y}Mn_y$.

Figure 18:
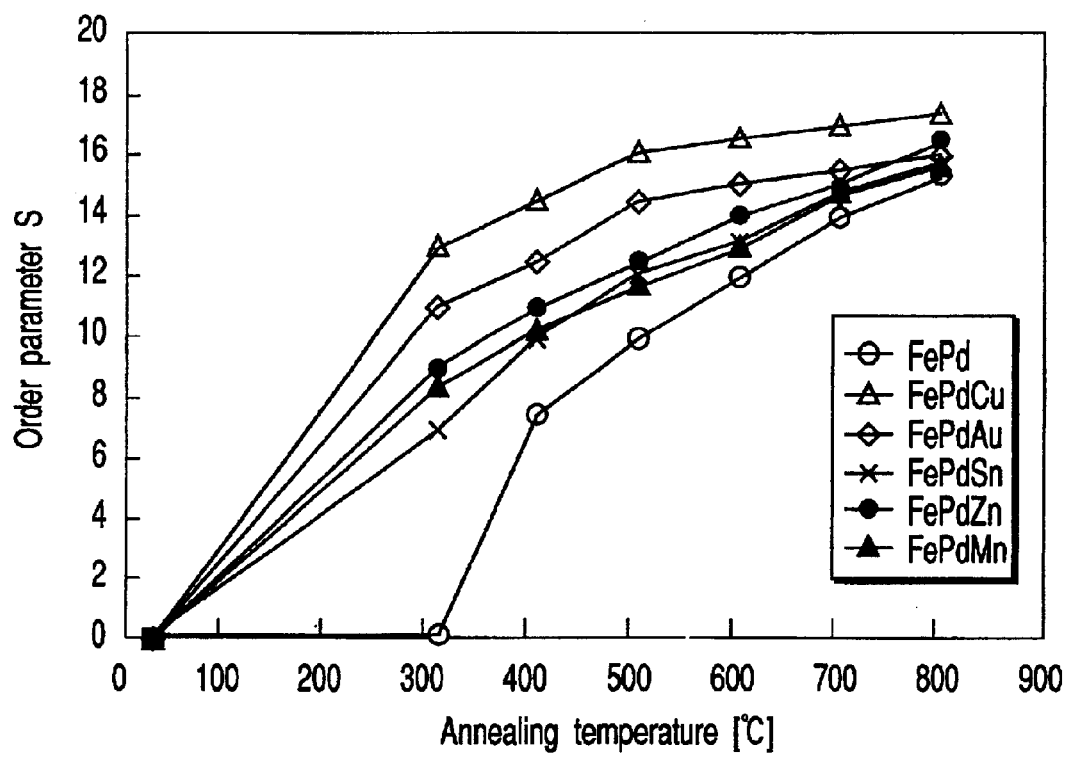
FIG. 18 is a graph showing relationship between annealing temperature and coercivity in the magnetic recording medium of Example 2.

FIG. 18 shows relationship between annealing temperature and coercivity with respect to the magnetic layers of: $Fe_{1-x}Pd_x$, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ and $(Fe_{1-x}Pd_x)_{100-y}Mn_y$, where x=0.5 and y=6 at%. As can be seen from FIG. 18, coercivity of 7 kOe or more was obtained under an annealing temperature of 300° C. or more in all of the magnetic layers other than $Fe_{1-x}Pd_x$. Similar tendencies as shown in FIG. 18 were also found in all of the magnetic layers other than Fe1-x $Pd_x$ in the range of $0.4 \leq x \leq 0.6$ and $0.1 \leq y \leq 50$.

Next, an underlayer formed of MgO and having a thickness of 10 nm, a magnetic layer having a thickness of 50 nm and a protective layer formed of carbon and having a thickness of 5 nm were successively deposited on the surface of glass substrate, under the condition that the glass substrate was heated to various temperatures in the range of 300 to 700° C. during deposition. The deposited magnetic layer was $Fe_{1-x}Pd_x$, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ or $(Fe_{1-x}Pd_x)_{100-y}Mn_y$. Annealing after deposition was not performed. After deposition, the resultant magnetic layers were evaluated by way of the same methods as described above.

Figure 19:
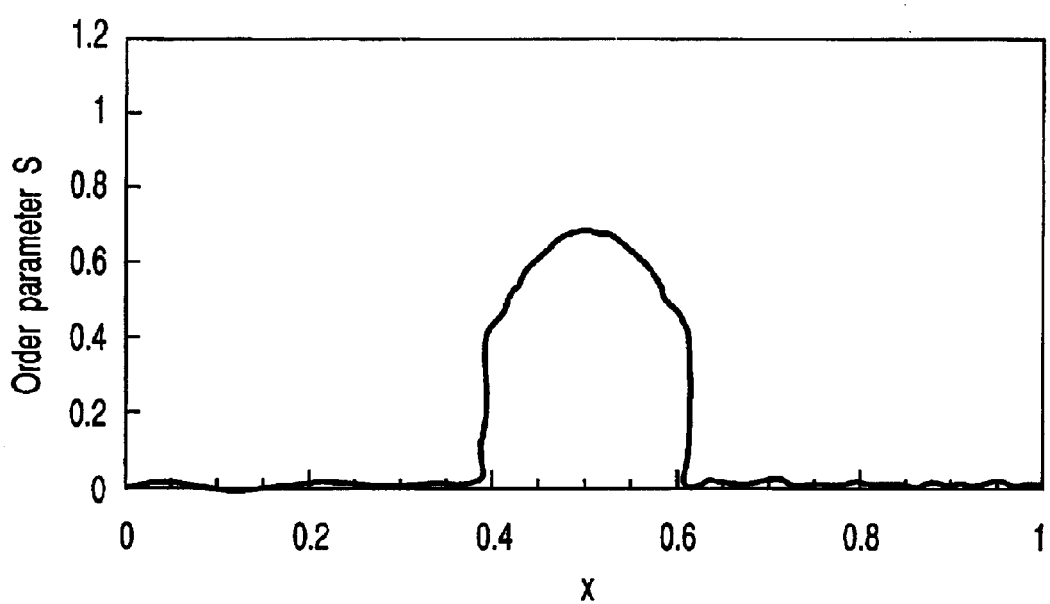
FIG. 19 is a graph showing relationship between composition and order parameter in the magnetic recording medium of Example 2.

FIG. 19 shows relationship between composition x and order parameter S of ordered alloy crystal with respect to $Fe_{1-x}Pd_x$ magnetic layer deposited under the condition of substrate temperature of 500° C. As a result, it was found that the order parameter of the ordered alloy crystal is enhanced in the range of $0.4 \leq x \leq 0.6$. Similar tendencies as described above were also found, irrespective of the amount of dissolved additive element, in each of the magnetic layers of: $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ or $(Fe_{1-x}Pd_x)_{100-y}Mn_y$.

FIG. 20 shows relationship between substrate temperature during deposition and order parameter S of ordered alloy crystal with respect to the magnetic layers of: FePd, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pd_x)_{100-y}Zn_y$ or $(Fe_{1-x}Pd_x)_{100-y}Mn_y$, where x=0.5 and y=6 at%. As can be seen from FIG. 20, in the case of the FePd magnetic layer, formation of ordered phase was not promoted when the substrate temperature was set to 300° C., and was promoted when the substrate temperature was raised to 400° C. or more. On the other hand, in all of the magnetic layers having a composition that an additive element was added to FePd, formation of ordered phase was promoted when the substrate temperature was set to 300° C. or more. In this way, it was found that addition of an additive element promotes ordering of crystal grains at a relatively low substrate temperature.

FIG. 21 shows relationship between dissolved Cu amount y [at%] in crystal grains and order parameter S of ordered alloy crystal with respect to $(Fe_{1-x}Pd_x)_{100-y}Cu_y$ magnetic layer, where x=0.5, which was deposited under the condition of substrate temperature of 300° C. As a result, it was confirmed that the order parameter was enhanced in the range of $0.1 \leq y \leq 50$. In particular, remarkable enhancement effect in the order parameter was obtained in the range of $3 \leq y \leq 20$. Similar results as described above were also obtained in the case of other additive elements.

FIG. 22 shows relationship between dissolved Cu amount y [at%] in crystal grains and Ku in the direction perpendicular to the substrate surface with respect to $(Fe_{1-x}Pd_x)_{100-y}Cu_y$ magnetic layer, where x=0.5, which was deposited under the condition of substrate temperature of 300° C. As a result, a high Ku value of 1×10$^7$ erg/cc or more was obtained in the range of 0.1≦y≦50, in particular, 3<y<20. Similar results as described above were also obtained in other magnetic layers of: $(Fe_{1-x}Pd_x)_{100-y}Au_y$, $(Fe_{1-x}Pd_x)_{100-y}Sn_y$, $(Fe_{1-x}Pt_x)_{100-y}Zn_y$ and $(Fe_{1-x}Pt_x)_{100-y}Mn_y$.

FIG. 23 shows relationship between substrate temperature during deposition and coercivity with respect to the magnetic layers of: $Fe_{1-x}Pd_x$, $(Fe_{1-x}Pd_x)_{100-y}Cu_y$, $(Fe_{1-x}Pd_x)_{100-y}Au_y$, $(Fe_{1-x}Pd_x)_{100-y}Sn_y$, $(Fe_{1-x}Pt_x)_{100-y}Zn_y$ and $(Fe_{1-x}Pt_x)_{100-y}Mn_y$, where x=0.5 and y=6 at%. As can be seen from FIG. 23, coercivity of 7 kOe or more was obtained where the substrate temperature was 300° C. or more in all of the magnetic layers other than $Fe_{1-x}Pd_x$. Similar tendencies as shown in FIG. 23 were also found in all of the magnetic layers other than $Fe_{1-x}Pd_x$ in the range of 0.4≦x≦0.6 and 0.1≦y≦50.

Next, an Fe—Pd—M magnetic layer having a thickness of 100 nm, 50 nm or 30 nm under similar conditions as described above, and then an average diameter of crystal grains was determined with TEM observation. As a result, average diameters of crystal grains contained in the magnetic layers having a thickness of 100 nm, 50 nm and 30 nm were 100 nm, 20 nm and 10 nm, respectively. Since recording resolution is improved if the grain diameter is as small as possible, a thinner magnetic layer is advantageous. Note that, the magnetic layers having a thickness of 100 nm or 30 nm exhibited similar characteristics to those of aforementioned magnetic layers having a thickness of 50 nm, except the average grain diameter.

Example 3

An underlayer formed of MgO and having a thickness of 10 nm, a magnetic layer having a thickness of 50 nm and a protective layer formed of carbon and having a thickness of 5 nm were successively deposited on the surface of glass substrate. The deposited magnetic layer was $Co_{1-x}Pt_x$, $(Co_{1-x}Pt_x)_{100-y}Ni_y$, $(Co_{1-x}Pt_x)_{100-y}Au_y$ or $(Co_{1-x}Pt_x)_{100-y}Mn_y$. The MgO underlayer was formed by means of RF sputtering, while the magnetic layer and the protective layer were formed by means of DC sputtering. Specifically, the magnetic layer was deposited by means of binary or ternary co-sputtering under a pressure of 5 mTorr or more, whose composition was controlled by changing the power applied to each of the targets. During deposition, the substrate was not heated. After deposition, the resultant structure was subjected to annealing in a hydrogen atmosphere for one hour at a temperature ranging from 300 to 700° C.

After annealing, the composition and magnetic characteristics of the magnetic layer were measured following the same methods as described in Example 1. Order parameter S was evaluated on the basis of the integrated intensities of diffraction peaks attributed to (001) and (002) planes obtained by X-ray diffraction, by way of the following formula:

$$S=0.74(I_{001}/I_{002})^{1/2}$$

where $I_{001}$ and $I_{002}$ represent the integrated intensities of the diffraction peaks attributed to the (001) and (002) planes, respectively.

FIG. 24 shows relationship between composition x and order parameter S of ordered alloy crystal in the $Co_{1-x}Pt_x$ magnetic layer annealed at 500° C. As a result, it was found that the order parameter of the ordered alloy crystal is enhanced in the range of 0.4≦x≦0.6. Similar tendencies as described above were also found, irrespective of the amount of dissolved additive element, in each of the magnetic layers of: $(Co_{1-x}Pt_x)_{100-y}Ni_y$, $(Co_{1-x}Pt_x)_{100-y}Au_y$ and $(Co_{1-x}Pt_x)_{100-y}Mn_y$.

FIG. 25 shows relationship between annealing temperature and order parameter S of ordered alloy crystal with respect to the magnetic layers of: CoPt, $(Co_{1-x}Pt_x)_{100-y}Ni_y$, $(Co_{1-x}Pt_x)_{100-y}Au_y$ and $(Co_{1-x}Pt_x)_{100-y}Mn_y$, where x=0.5 and the dissolved amount of the additive element y=6 at%. As can be seen from FIG. 25, in the case of the CoPt magnetic layer, formation of ordered phase was not promoted when the annealing temperature was set to 300° C., and was promoted when the annealing temperature was raised to 400° C. or more. On the other hand, in all of the magnetic layers having a composition that an additive element was added to CoPt, formation of ordered phase was promoted when the annealing temperature was set to 300° C. or more. In this way, it was found that addition of an additive element promotes order of crystal grains at a relatively low annealing temperature.

FIG. 26 shows relationship between dissolved Ni amount y [at%] in crystal grains and order parameter S of ordered alloy crystal with respect to $(Co_{1-x}Pt_x)_{100-y}Ni_y$ magnetic layer, where x=0.5, which was annealed at 300° C. As a result, it was confirmed that the order parameter was enhanced in the range of 0.1≦y≦50. In particular, remarkable enhancement effect in the order parameter was obtained in the range of 3≦y≦20. Similar results as described above were also obtained in the case of other additive elements.

FIG. 27 shows relationship between dissolved Ni amount y [at%] in crystal grains and Ku in the direction perpendicular to the substrate surface with respect to $(Co_{1-x}Pt_x)_{100-y}Ni_y$ magnetic layer, where x=0.5, which was annealed at 300° C. As a result, a high Ku value of 1×10$^7$ erg/cc or more was obtained in the range of 0.1≦y≦50, in particular, 3≦y≦≦20. Similar results as described above were also obtained in other magnetic layers of: $(Co_{1-x}Pt_x)_{100-y}Au_y$ and $(Co_{1-x}Pt_x)_{100-y}Mn_y$.

Figure 28:
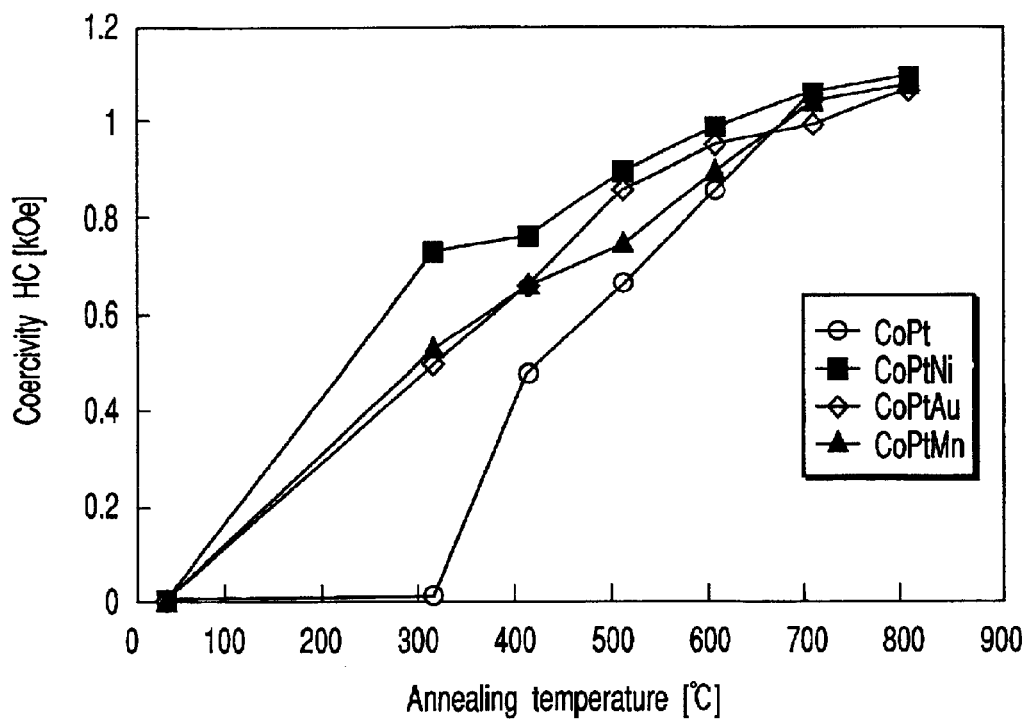
FIG. 28 is a graph showing relationship between annealing temperature and coercivity in the magnetic recording medium of Example 3.

FIG. 28 shows relationship between annealing temperature and coercivity with respect to the magnetic layers of: $Co_{1-x}Pt_x$, $(Co_{1-x}Pt_x)_{100-y}Ni_y$, $(Co_{1-x}Pt_x)_{100-y}Au_y$ and $(Co_{1-x}Pt_x)_{100-y}Mn_y$, where x=0.5 and y=6 at%. As can be seen from FIG. 28, coercivity of 7 kOe or more was obtained under an annealing temperature of 300° C. or more in all of the magnetic layers other than $Co_{1-x}Pt_x$. Similar tendencies as shown in FIG. 28 were also found in all of the magnetic layers other than $Co_{1-x}Pt_x$ in the range of 0.4≦x≦0.6 and 0.1≦y≦50.

Next, an underlayer formed of MgO and having a thickness of 10 nm, a magnetic layer having a thickness of 50 nm and a protective layer formed of carbon and having a thickness of 5 nm were successively deposited on the surface of glass substrate, under the condition that the glass substrate was heated to various temperatures in the range of 300 to 700° C. during deposition. The deposited magnetic layer was $Co_{1-x}Pt_x$, $(Co_{1-x}Pt_x)_{100-y}Ni_y$, $(Co_{1-x}Pt_x)_{100-y}Au_y$ or $(Co_{1-x}Pt_x)_{100-y}Mn_y$. Annealing after deposition was not performed. After deposition, the resultant magnetic layers were evaluated by way of the same methods as described above.

Figure 29:
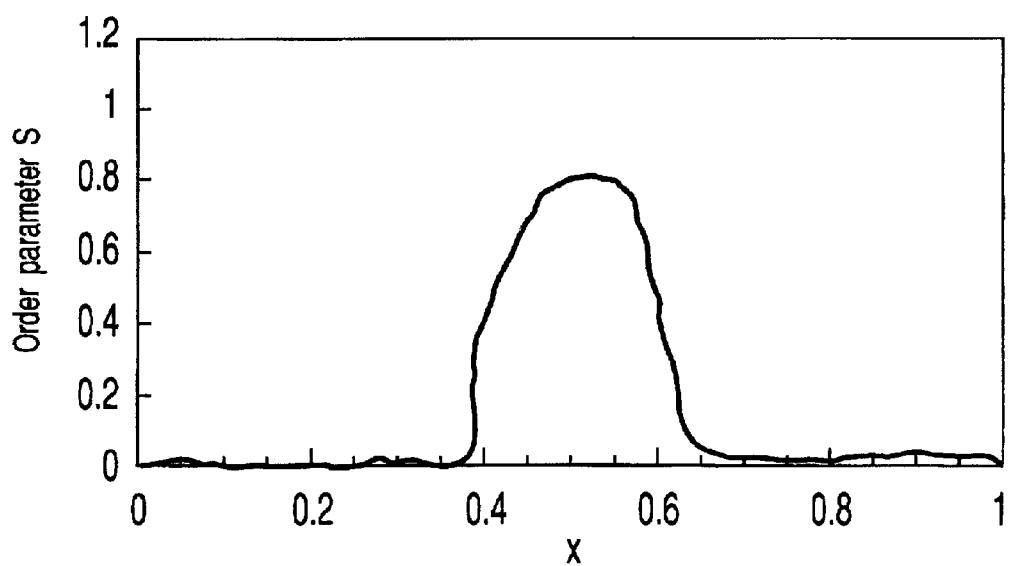
FIG. 29 is a graph showing relationship between composition and order parameter in the magnetic recording medium of Example 3.

FIG. 29 shows relationship between composition x and order parameter S of ordered alloy crystal with respect to $Co_{1-x}Pt_x$ magnetic layer deposited under the condition of substrate temperature of 500° C. As a result, it was found that the order parameter of the ordered alloy crystal is enhanced in the range of 0.4≦x≦0.6. Similar tendencies as described above were also found, irrespective of the amount of dissolved additive element, in each of the magnetic layers of: $(Co_{1-x}Pt_x)_{100-y}Ni_y$, $(Co_{1-x}Pt_x)_{100-y}Au_y$ and $(Co_{1-x}Pt_x)_{100-y}Mn_y$.

FIG. 30 shows relationship between substrate temperature during deposition and order parameter S of ordered alloy crystal with respect to the magnetic layers of: CoPt, $(Co_{1-x}Pt_x)_{100-y}Ni_y$, $(Co_{1-x}Pt_x)_{100-y}Au_y$, and $(Co_{1-x}Pt_x)_{100-y}Mn_y$, where x=0.5 and y=6 at%. As can be seen from FIG. 30, in the case of the CoPt magnetic layer, formation of ordered phase was not promoted when the substrate temperature was set to 300° C., and was promoted when the substrate temperature was raised to 400° C. or more. On the other hand, in all of the magnetic layers having a composition that an additive element was added to CoPt, formation of ordered phase was promoted when the substrate temperature was set to 300° C. or more. In this way, it was found that addition of an additive element promotes ordering of crystal grains at a relatively low substrate temperature.

FIG. 31 shows relationship between dissolved Ni amount y [at%] in crystal grains and order parameter S of ordered alloy crystal with respect to $(Co_{1-x}Pt_x)_{100-y}Ni_y$ magnetic layer, where x=0.5, which was deposited under the condition of substrate temperature of 300° C. As a result, it was confirmed that the order parameter was enhanced in the range of $0.1 \leq y \leq 50$. In particular, remarkable enhancement effect in the order parameter was obtained in the range of $3 \leq y \leq 20$. Similar results as described above were also obtained in the case of other additive elements.

Figure 32:
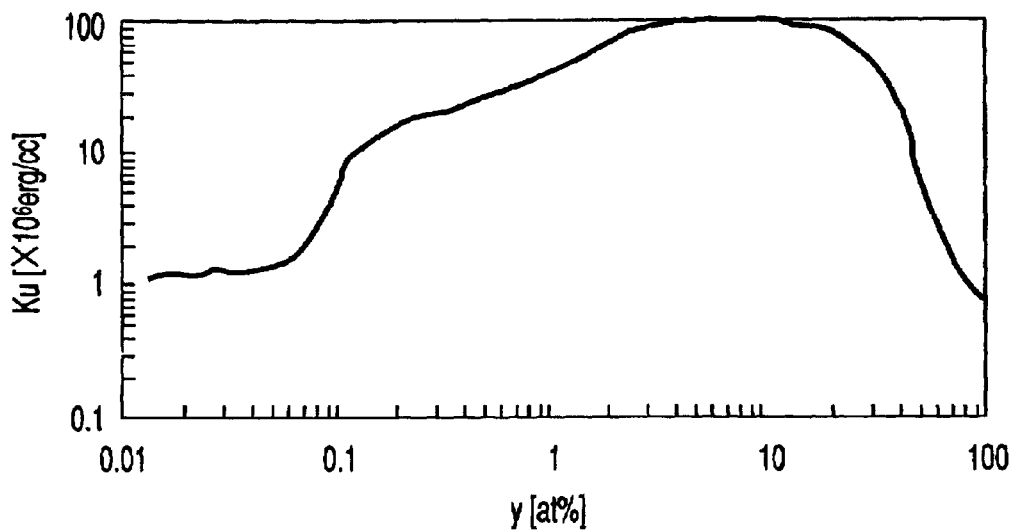
FIG. 32 is a graph showing relationship between amount of dissolved additive element and Ku in the magnetic recording medium of Example 3.

FIG. 32 shows relationship between dissolved Ni amount y [at%] in crystal grains and Ku in the direction perpendicular to the substrate surface with respect to $(Co_{1-x}Pt_x)_{100-y}Ni_y$ magnetic layer, where x=0.5, which was deposited under the condition of substrate temperature of 300° C. As a result, a high Ku value of $1 \times 10^7$ erg/cc or more was obtained in the range of $0.1 \leq y \leq 50$, in particular, $3 \leq y \leq 20$. Similar results as described above were also obtained in other magnetic layers of: $(Co_{1-x}Pt_x)_{100-y}Au_y$ and $(Co_{1-x}Pt_x)_{100-y}Mn_y$.

Figure 33:
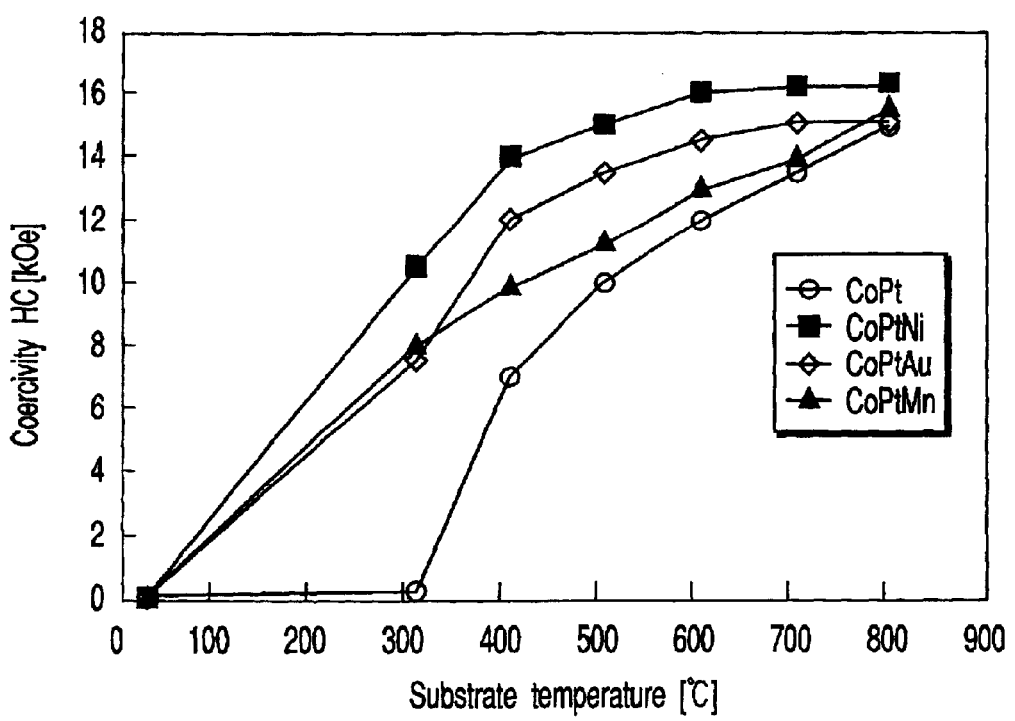
FIG. 33 is a graph showing relationship between substrate temperature during deposition and coercivity in the magnetic recording medium of Example 3.

FIG. 33 shows relationship between substrate temperature during deposition and coercivity with respect to the magnetic layers of: $Co_{1-x}Pt_x$, $(Co_{1-x}Pt_x)_{100-y}Ni_y$, $(Co_{1-x}Pt_x)_{100-y}AU_y$ and $(Co_{1-x}Pt_x)_{100-y}Mn_y$, where x=0.5 and y=6 at%. As can be seen from FIG. 33, coercivity of 7 kOe or more was obtained where the substrate temperature was 300° C. or more in all of the magnetic layers other than $Co_{1-x}Pt_x$. Similar tendencies as shown in FIG. 33 were also found in all of the magnetic layers other than $Co_{1-x}Pt_x$ in the range of $0.4 \leq x \leq 0.6$ and $0.1 \leq y \leq 50$.

Next, a Co—Pt—M magnetic layer having a thickness of 100 nm, 50 nm or 30 nm under similar conditions as described above, and then an average diameter of crystal grains was determined with TEM observation. As a result, average diameters of crystal grains contained in the magnetic layers having a thickness of 100 nm, 50 nm and 30 nm were 100 nm, 20 nm and 10 nm, respectively. Since recording resolution is improved if the grain diameter is as small as possible, a thinner magnetic layer is advantageous. Note that, the magnetic layers having a thickness of 100 nm or 30 nm exhibited similar characteristics to those of aforementioned magnetic layers having a thickness of 50 nm, except the average grain diameter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising: a substrate; an underlayer formed on the substrate; a magnetic layer formed on the underlayer, wherein the magnetic layer comprising crystal grains having
   (a) an L1$_0$ structure mainly including Fe and Pt, and
   (b) 0.1 to 50 atomic percent of at least one element selected from the group consisting of Cu, Au, Zn, Sn, Pd and Mn; and a protective layer formed on the magnetic layer, wherein the crystal grain has a composition represented by the following formula:

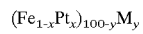

$(Fe_{1-x}Pt_x)_{100-y}M_y$ where x ranges from 0.4 to 0.6, y ranges from 0.1 to 50, M is at least one element selected from the group consisting of Cu, Au, Zn, Sn, Pd and Mn.

2. The medium according to claim 1, wherein the substrate is a glass substrate.

3. The medium according to claim 1, wherein x ranges from 0.4 to 0.56, y ranges from 3 to 20.

4. The medium according to claim 1, wherein the magnetic layer has a thickness of 50 nm or less.

5. A magnetic recording medium comprising: a substrate; an underlayer formed on the substrate; a magnetic layer formed on the underlayer, where: the magnetic layer comprising crystal grains having
   (a) an L1$_0$ structure mainly including Fe and Pd, and
   (b) 0.1 to 50 atomic percent of at least one element selected from the group consisting of Cu, Au, Zn, Sn and Mn; and a protective layer formed on the magnetic layer, wherein the crystal grain has a composition represented by the following formula:

$(Fe_{1-x}Pd_x)_{100-y}M_y$ where x ranges from 0.4 to 0.6, y ranges from 0.1 to 50, M is at least one element selected from the group consisting of Cu, Au, Zn, Sn and Mn.

6. The medium according to claim 5, wherein the substrate is a glass substrate.

7. The medium according to claim 5, wherein x ranges from 0.4 to 0.56, y ranges from 3 to 20.

8. The medium according to claim 5, wherein the magnetic layer has a thickness of 50 nm or less.

9. A magnetic recording medium comprising: a substrate; an underlayer formed on the substrate; a magnetic layer formed on the underlayer, wherein the magnetic layer comprising crystal grains having
   (a) an L1$_0$ structure mainly including Co and Pt, and
   (b) 0.1 to 50 atomic percent of at least one element selected from the group consisting of Ni, Au and Mn; and a protective layer formed on the magnetic layer, wherein the crystal grain has a composition represented by the following formula:

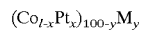

$(Co_{1-x}Pt_x)_{100-y}M_y$ where x ranges from 0.4 to 0.6, y ranges from 0.1 to 50, M is at least one element selected from the group consisting of Ni, Au and Mn.

10. The medium according to claim 9, wherein the substrate is a glass substrate.

11. The medium according to claim 9, wherein x ranges from 0.4 to 0.56, y ranges from 3 to 20.

12. The medium according to claim 9, wherein the magnetic layer has a thickness of 50 nm or less.

13. The medium according to claim 1, wherein the crystal grain has a composition represented by the following formula:

$$(Fe_{1-x}Pt_x)_{100-y}Cu_y$$

where x ranges from 0.4 to 0.6, y ranges from 0.1 to 50.

14. The medium according to claim 5, wherein the crystal grain has a composition represented by the following formula:

$$(Fe_{1-x}Pd_x)_{100-y}Cu_y$$

where x ranges from 0.4 to 0.6, y ranges from 0.1 to 50.

15. The medium according to claim 1, wherein the underlayer is made of MgO.

16. The medium according to claim 5, wherein the underlayer is made of MgO.

17. The medium according to claim 9, wherein the underlayer is made of MgO.

* * * * *